(12) United States Patent
Fukasawa

(10) Patent No.: US 7,274,487 B2
(45) Date of Patent: Sep. 25, 2007

(54) COLOR SPACE CONVERTING APPARATUS AND METHOD OF COLOR SPACE CONVERSION

(75) Inventor: Kenji Fukasawa, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 1092 days.

(21) Appl. No.: 10/099,887

(22) Filed: Mar. 14, 2002

(65) Prior Publication Data

US 2003/0034986 A1 Feb. 20, 2003

(51) Int. Cl.
*G06F 15/00* (2006.01)
(52) U.S. Cl. .................. 358/1.9; 358/2.1; 358/518; 345/589
(58) Field of Classification Search ............... 358/1.9, 358/2.1, 518; 345/589
See application file for complete search history.

(56) References Cited

U.S. PATENT DOCUMENTS

| 6,011,547 | A  |   | 1/2000  | Shiota et al.   |         |
|-----------|----|---|---------|-----------------|---------|
| 6,125,199 | A  | * | 9/2000  | Sato et al.     | 382/162 |
| 6,273,535 | B1 |   | 8/2001  | Inoue et al.    |         |
| 6,320,980 | B1 | * | 11/2001 | Hidaka          | 382/167 |
| 6,459,436 | B1 | * | 10/2002 | Kumada et al.   | 345/590 |
| 7,027,067 | B1 | * | 4/2006  | Ohga            | 345/589 |

FOREIGN PATENT DOCUMENTS

| JP | 06-008537  | 1/1994  |
| JP | 09-219817  | 8/1997  |
| JP | 10-191246  | 7/1998  |
| JP | 10-226139  | 8/1998  |
| JP | 11-041622  | 2/1999  |
| JP | 11-088672  | 3/1999  |
| JP | 11-127340  | 5/1999  |
| JP | 11-127415  | 5/1999  |
| JP | 11-327605  | 11/1999 |
| JP | 11-331596  | 11/1999 |
| JP | 11-341294  | 12/1999 |
| JP | 11-355585  | 12/1999 |
| JP | 2000-013718 | 1/2000 |

(Continued)

OTHER PUBLICATIONS

Abstract of Japanese Patent Pub. No. 06-008537, Pub. Date: Jan. 18, 1994, Patent Abstracts of Japan.

(Continued)

*Primary Examiner*—Kimberly Williams
*Assistant Examiner*—Michael Burleson
(74) *Attorney, Agent, or Firm*—Martine Penilla & Gencarella, LLP

(57) ABSTRACT

When an sRGB color space and an wRGB color space have a common white point in a device-independent color space, the CPU 31 of a color printer 20 eliminates deviation of the white points of the two color spaces occurring when a color value of the sRGB color space has been converted to a color value of the wRGB color space using a matrix operation L, by correcting the coefficients of matrix L. As a result of correction a matrix L' is obtained. CPU 31 executes gamma correction on the RGB color space color value obtained by a matrix operation S, and then executes matrix operation L'. CPU 31 executes inverse gamma correction on the color value obtained by a matrix operation L'.

24 Claims, 8 Drawing Sheets

FOREIGN PATENT DOCUMENTS

| | | |
|---|---|---|
| JP | 2000-137806 | 5/2000 |
| JP | 2000-278598 | 10/2000 |
| JP | 2001-147481 | 5/2001 |

OTHER PUBLICATIONS

Abstract of Japanese Patent Pub. No. 09-219817, Pub. Date: Aug. 19, 1997, Patent Abstracts of Japan.

Abstract of Japanese Patent Pub. No. 10-191246, Pub. Date: Jul. 21, 1998, Patent Abstracts of Japan.

Abstract of Japanese Patent Pub. No. 10-226139, Pub. Date: Aug. 25, 1998, Patent Abstracts of Japan.

Abstract of Japanese Patent Pub. No. 11-088672, Pub. Date: Mar. 3, 1999, Patent Abstracts of Japan.

Abstract of Japanese Patent Pub. No. 11-127415, Pub. Date: May 11, 1999, Patent Abstracts of Japan.

Abstract of Japanese Patent Pub. No. 11-331596, Pub. Date: Nov. 30, 1999, Patent Abstracts of Japan.

Abstract of Japanese Patent Pub. No. 2000-013718, Pub. Date: Jan. 14, 2000, Patent Abstracts of Japan.

Abstract of Japanese Patent Pub. No. 2000-137806, Pub. Date: May 16, 2000, Patent Abstracts of Japan.

Abstract of Japanese Patent Pub. No. 2001-147481, Pub. Date: May 29, 2001, Patent Abstracts of Japan.

Abstract of Japanese Patent Publication 11-041622, Pub. Date: Feb. 12, 1999, Patent Abstracts of Japan.

Abstract of Japanese Patent Publication 11-327605, Pub. Date: Nov. 26, 1999, Patent Abstracts of Japan.

Abstract of Japanese Patent Publication 2000-278598, Pub. Date: Oct. 6, 2000, Patent Abstracts of Japan.

Abstract of Japanese Patent Publication No. 11-127340, Pub. Date: May 11, 1999, Patent Abstracts of Japan.

Abstract of Japanese Patent Publication No. 11-341294, Pub. Date: Dec. 10, 1999, Patent Abstrats of Japan.

Abstract of Japanese Patent Publication No. 11-355585, Pub. Date: Dec. 24, 1999, Patent Abstracts of Japan.

* cited by examiner

COLOR SPACE CONVERTING APPARATUS AND METHOD OF COLOR SPACE CONVERSION

FIELD OF THE INVENTION

The present invention relates to an image processing technique for converting color values based on one color space to color values based on another color space.

BACKGROUND OF THE INVENTION

When converting a device-dependent color space that is dependent on the color reproduction characteristics of a device, for example, when converting a color value in a first device-dependent color space to a color value in a second device-dependent color space, color matching of color value is performed through the agency of a device-independent color space that is independent of any device, so as to match color reproduction in the color space prior to conversion and the color space subsequent to conversion.

During conversion of the color space of a color value, typically, an operation using a matrix is performed, for example, using a first matrix when converting the color space of the color value from a first color space to a device-independent color space, and using a second matrix when converting the color space of the color value from a second color space to a device-independent color space. When converting the color space of a color value from a first color space to a second color space, in order to accelerate the conversion process, a third matrix calculated in advance on the basis of the first matrix and the second matrix is used to perform conversion processing of the color space of the color value.

However, where the effective number of decimal places of the third matrix calculated from the first matrix and the second matrix has not been rounded, so that a large effective number of decimal places is retained, there is the problem that a long time is required for color space conversion processing.

On the other hand, if, in order to accelerate the conversion process, the effective number of decimal places of the third matrix has been rounded, even if the white points of the first and second color spaces should match in the device-independent color space, the color value based on the second color space obtained by converting the color value of the white point based on the first color space using the third matrix will not match the color value of the white point based on the second color space, that is, there is the problem of inferior color space conversion accuracy. Typically, human visual perception is sensitive in the colorless region that contains the white point, so even slight deviation in color value will be apparent to the eye, so that it becomes impossible to achieve correct color reproduction.

Also, where white point data in the first color space and white point data in the second color space originally do not match in the device-independent color space, there is the problem that even if conversion process accuracy using the third matrix is raised, the white point in the first color space and the white point in the second color space will not match, so a color space conversion process satisfactory to the user cannot be performed.

SUMMARY OF THE INVENTION

The present invention was made in order to solve the above-mentioned problems, and has as an object to improve color space conversion accuracy in cases where the white point in the color space of a conversion source matches the white point in the color space of a conversion destination, as well as performing color space conversion processing of color values at high speed. It is a further object to perform color space conversion processing of a color value while eliminating the effects of white point mismatch in cases where the white point in the color space of a conversion source does not match the white point in the color space of a conversion destination.

To solve the problem a first aspect of the present invention provides a color space converting apparatus for converting a color value of a first color space to a color value of a second color space. The color space converting apparatus pertaining to the first aspect of the present invention comprises a first color space converting mechanism for reflecting deviation of converted a color value derived by converting the color value of the white point of the first color space to the second color space, and the color value of the white point of the second color space, and converting the color value of the first color space to the color value of the second color space.

In the color space converting apparatus pertaining to the first aspect of the present invention, the first color space converting mechanism may comprise a plurality of color conversion tables, prepared for each combination of the first color space and second color space, having characteristics for matching a converted color value, derived by converting to the second color space the color value of the white point of the first color space, with the color value of the white point of the second color space, selecting means for selecting, on the basis of a combination of the first color space and the second color space, one color conversion table from among the plurality of color conversion tables, and second color space converting means for converting a color value of the first color space to a color value of the second color space using the selected color conversion table.

In the color space converting apparatus pertaining to the first aspect of the present invention, the first color space converting mechanism may comprise a plurality of color conversion matrices, prepared for each combination of the first color space and second color space, having characteristics for matching a converted color value, derived by converting to the second color space the color value of the white point of the first color space, with the color value of the white point of the second color space, selecting means for selecting, on the basis of a combination of the first color space and the second color space, one color conversion matrix from among the plurality of color conversion matrices, and third color space converting means for executing a matrix operation to convert a color value of the first color space to a color value of the second color space using the selected color conversion matrix.

The first aspect of the present invention also provides a method of color space conversion for converting a color value of a first color space to a color value of a second color space. The method of color space conversion pertaining to the first aspect of the present invention is characterized in that a color value of the first color space is modified to a color value of the second color space, in such a way as to eliminate deviation of a converted color value, derived by converting the color value of the white point of the first color space to the second color space, with respect to the color value of the white point of the second color space.

The first aspect of the present invention also provides a color space converting program for converting a color value of a first color space to a color value of a second color space.

The color space converting program pertaining to the first aspect of the present invention is characterized in that a first color conversion function for modifying a color value of the first color space to a color value of the second color space, in such a way as to eliminate deviation of a converted color value, derived by converting the color value of the white point of the first color space to the second color space, with respect to the color value of the white point of the second color space, is realized by means of a computer.

According to the first aspect of the present invention, color space is converted using a single matrix operation or color conversion table, so fast color conversion processing can be executed. Further, deviation (error) occurring with color space conversion can be eliminated, so that the accuracy of color space conversion can be improved.

In the color space converting apparatus pertaining to the first aspect of the present invention, the first color space and second color space may be device-dependent color spaces dependent on a device, and a first color value of a device-independent color space, derived by converting the color value of the white point of the first color space, may be equal to a second color value of the device-independent color space, derived by converting the color value of the white point of the second color space. Where this arrangement is provided, the first aspect of the present invention can better improve the accuracy of color space conversion.

A second aspect of the present invention provides a color space converting apparatus for converting a color value of a first color space to a color value of a second color space. The color space converting apparatus pertaining to the second aspect of the present invention comprises color space converting means for performing a matrix operation to convert a color value of the first color space to a color value of the second color space, deviation calculating means for calculating deviation of the color value of the achromatic color of the second color space with respect to a converted color value of the second color space, derived by executing the matrix operation on the color value of the achromatic color of the first color space, and conversion accuracy improving means for reflecting the calculated deviation to improve color space conversion accuracy.

According to the second aspect of the present invention, color space is converted using a single matrix operation or color conversion table, so fast color conversion processing can be executed. Further, deviation (error) occurring with color space conversion can be eliminated, so the accuracy of color space conversion can be improved.

In the color space converting apparatus pertaining to the second aspect of the present invention, the first color space and second color space may be device-dependent color spaces dependent on a device, and a first color value of a device-independent color space, derived by converting the color value of the achromatic color of the first color space, may be equal to a second color value of the device-independent color space, derived by converting the color value of the achromatic color of the second color space. Where this arrangement is provided, the accuracy of color space conversion can be better improved.

A third aspect of the present invention provides a color space converting apparatus for matching the color value of the white point of a first color space with the color value of the white point of a second color space in a device-independent color space that is independent of any device, and converting a color value of the first color space to a color value of the second color space. The color space converting apparatus pertaining to the third aspect of the present invention comprises a plurality of color conversion tables, prepared for each combination of the first color space and second color space, having characteristics for matching the color value of the white point of the second color space with a converted color value, derived by converting the color value of the white point of the first color space to the second color space using a third matrix generated on the basis of a first matrix for converting a color value of the first color space to a color value of the device-independent color space, and a second matrix for converting a color value of the second color space to a color value of the device-independent color space; selecting means for selecting, on the basis of a combination of the first color space and the second color space, one color conversion table from among the plurality of color conversion tables; and color space converting means for converting a color value of the first color space to a color value of the second color space using the selected color conversion table.

According to the third aspect of the present invention, the color value of the white point of a first color space and the color value of the white point of a second color space can be matched in a device-independent color space, and error occurring with color space conversion can be eliminated, so that the color value of the white point of the color space prior to conversion can be matched with the color value of the white point of the color space after conversion, and the accuracy of color space conversion can be improved. Further, since color space is converted by executing a single matrix operation, fast color conversion processing can be executed. Color values in a first color space can be modified to color values in a second color space using a color conversion table instead of executing a matrix operation.

The color space converting apparatus pertaining to the third aspect of the present invention may comprise color space converting means for converting a color value of the first color space to a color value of the second color space using a third matrix created on the basis of a first matrix for converting a color value of the first color space to a color value of the device-independent color space and a second matrix for converting a color value of the second color space to a color value of the device-independent color space; deviation calculating means for calculating deviation of the color value of the achromatic color of the second color space with respect to a converted color value converted from the color value of the achromatic color of the first color space to a color value of the second color space by means of the converting means; and conversion accuracy improving means for reflecting the calculated deviation to improve color space conversion accuracy by the converting means.

According to the third aspect of the present invention, the color value of the white point of a first color space and the color value of the white point of a second color space can be matched in a device-independent color space, and deviation (error) occurring with color space conversion can be eliminated, so the color value of the achromatic color of the color space prior to conversion and the color value of the achromatic color of the color space after conversion can be matched, and the accuracy of color space conversion can be improved. Further, since color space is converted by executing a single matrix operation, fast color conversion processing can be executed. Color values in a first color space can be modified to color values in a second color space using a color conversion table instead of executing a matrix operation.

The color space converting apparatus pertaining to the third aspect of the present invention may further comprise file reading means for reading the color value and output control information from a file that includes within a single file the color value and the output control information, which stipulates output conditions for color values, with the first color space being determined on the basis of the read output control information. Where this arrangement is provided, the color space of a color value can be acquired automatically. Also, the deviation calculating means can correct the color value of the converted white point to eliminate the deviation; or the deviation can be reflected, and the third matrix corrected in order to eliminate the deviation. In either case, deviation occurring with color space conversion can be eliminated.

The third aspect of the present invention provides a color space converting program for matching the color value of the white point of a first color space with the color value of the white point of a second color space in a device-independent color space, and converting a color value of the first color space to a color value of the second color space. The color space converting program pertaining to the third aspect of the present invention is characterized in that a function for calculating deviation of the color value of the white point of the second color space with respect to a color value that has been converted from the color value of the white point of the first color space to the second color space using a third matrix created on the basis of a first matrix for converting a color value of the first color space to a color value of the device-independent color space and a second matrix for converting a color value of the second color space to a color value of the device-independent color space; and a function for improving conversion accuracy improving on the basis of the calculated deviation, are realized by means of a computer.

The third aspect of the present invention may also be provided as a method of color space conversion. Where provided as a color space converting program or method of color space conversion, it is possible to obtain working effects similar to those obtainable where provided as a color space converting apparatus. Like the color space converting apparatus pertaining to the third aspect of the present invention, color values in a first color space can be modified to color values in a second color space using a color conversion table instead of executing a matrix operation.

A fourth aspect of the present invention provides a color space converting apparatus for converting a color value of a first color space to a color value of a second color space. The color space converting apparatus pertaining to the fourth aspect of the present invention comprises first converting means for converting a color value of the first color space to a color value of a device-independent color space using a first matrix; second converting means for converting a color value of the second color space to a color value of the device-independent color space using a second matrix; determining means for determining whether the color value of a first white point in the device-independent color space converted from the color value of the white point of the first color space by the first converting means matches the color value of a second white point in the device-independent color space converted from the color value of the white point of the second color space by the second converting means; third converting means for converting a color value of the first color space to a color value of the second color space using a third matrix created on the basis of the first matrix and the second matrix; deviation calculating means that, in the event it is determined that the color value of the first white point and the color value of the second white point match, calculates deviation of the color value of the achromatic color of the second color space and a converted color value that has been converted by the third converting means from the color value of the achromatic color in the first color space to a color value in the second color space; and conversion accuracy improving means for improving color space conversion accuracy by the third converting means on the basis of the calculated deviation.

According to the fourth aspect of the present invention, it can be determined whether the color value of the white point of a first color space and the color value of the white point of a second color space match in a device-independent color space, and in the event that they match, deviation (error) occurring with color space conversion can be eliminated, so a decline in color space conversion accuracy due to achromatic color (white point) mismatch can be prevented. Further, since color space is converted by executing a single matrix operation, fast color conversion processing can be executed.

The color space converting apparatus pertaining to the fourth aspect of the present invention may further comprise first correcting means that, in the event it is determined that the color value of the first white point and the color value of the second white point do not match, corrects the second matrix so that the color value of the second white point matches the color value of the first white point; or second correcting means that corrects the first matrix so that the color value of the first white point matches the color value of the second white point.

According to the fourth aspect of the present invention, it can be determined whether the color value of the white point of a first color space and the color value of the white point of a second color space match in a device-independent color space, and in the event that they do not match, the white points are matched, thus improving color space conversion accuracy even where white points do not match. Further, since color space is converted by executing a single matrix operation, fast color conversion processing can be executed.

The fourth aspect of the present invention provides a method of color space conversion for converting a color value of a first color space to a color value of a second color space. The method of color space conversion pertaining to the fourth aspect of the present invention is characterized by determining whether the color value of a first white point converted, using a first matrix, from the color value of the white point of the first color space to the color value of the white point of the device-independent color space, matches the color value of a second white point converted, using a second matrix, from the color value of the white point of the second color space to the color value of the white point of the device-independent color space; in the event that the first white point and the second white point match, calculating deviation of the color value of the achromatic color of the second color space that has been converted to the second color space from the color value of the achromatic color in the first color space using a third matrix created on the basis of the first matrix and the second matrix; and correcting the coefficient of the third matrix so as to eliminate the calculated deviation.

The fourth aspect of the present invention further provides a color space converting program for matching a color value of a first color space with a color value of a second color space. The color space converting program pertaining to the fourth aspect of the present invention is characterized in that a function for determining whether the color value of a first white point converted, using a first matrix, from the color value of the white point of the first color space to the color value of the white point of a device-independent color space, matches the color value of a second white point converted, using a second matrix, from the color value of the white point of the second color space to the color value of the white point of the device-independent color space; a function for, in the event that the first white point and the second white point match, calculating deviation of the color value of the achromatic color of the second color space from a converted color value that has been converted to the second color space from the color value of the achromatic color in the first color space using a third matrix created on the basis of the first matrix and the second matrix; and a function of reflecting the calculated deviation to improve the accuracy of the color space conversion, are realized by means of a computer.

A fifth aspect of the present invention provides a color space converting apparatus for matching the white point in a first RGB color space with the white point of a second RGB color space in an XYZ color space, and converting a color value (R1, G1, B1) of the first RGB color space to a color value (R2, G2, B2) of the second RGB color space. The color space converting apparatus pertaining to the fifth aspect of the present invention may comprise converting means for converting a color value (R1, G1, B1) of the first RGB color space to a color value (R2, G2, B2) of the second RGB color space by means of the following Equation 1, using a matrix $L=N^{-1}M$ calculated in advance on the basis of a matrix M used when converting a color value in a first RGB color space to a color value of an XYZ color space, and a matrix N used when converting a color value in a second RGB color space to a color value of an XYZ color space;

$$\begin{pmatrix} R2 \\ G2 \\ B2 \end{pmatrix} = L \begin{pmatrix} R1 \\ G1 \\ B1 \end{pmatrix} = \begin{pmatrix} a3 & b3 & c3 \\ d3 & e3 & f3 \\ g3 & h3 & i3 \end{pmatrix} \begin{pmatrix} R1 \\ G1 \\ B1 \end{pmatrix} \quad \text{Equation 1}$$

deviation calculating means for calculating deviation of a color value (1, 1, 1) representing the white point of the second color space with respect to a converted white point color value (a3+b3+c3, d3+e3+f3, g3+h3+i3), converted by the converting means from a color value (1, 1, 1) representing the white point of the first color space, to a color value representing the white point of the second color space, and conversion accuracy improving means for reflecting the calculated deviation to improve color space conversion accuracy by the converting means.

The fifth aspect of the present invention may also be provided as a method of color space conversion or a color space converting program. In either case it is possible to obtain working effects similar to those of the third aspect of the present invention, and like third aspect of the present invention, it can be realized through various aspects.

A sixth aspect of the present invention provides a color space converting apparatus for converting a color value (R1, G1, B1) in a first RGB color space to a color value (R2, G2, B2) in a second RGB color space. The color space converting apparatus according to the sixth aspect of the present invention comprises first converting means for converting a color value (R1, G1, B1) of the first RGB color space to a color value (X, Y, Z) of an XYZ color space by means of the following Equation 1, using a matrix M, $$\begin{pmatrix} X \\ Y \\ Z \end{pmatrix} = M \begin{pmatrix} R1 \\ G1 \\ B1 \end{pmatrix} = \begin{pmatrix} a1 & b1 & c1 \\ d1 & e1 & f1 \\ g1 & h1 & i1 \end{pmatrix} \begin{pmatrix} R1 \\ G1 \\ B1 \end{pmatrix} \quad \text{Equation 1}$$

second converting means for converting a color value (R2, G2, B2) of the second RGB color space to a color value (X, Y, Z) of an XYZ color space by means of the following Equation 2, using a matrix N, $$\begin{pmatrix} X \\ Y \\ Z \end{pmatrix} = N \begin{pmatrix} R2 \\ G2 \\ B2 \end{pmatrix} = \begin{pmatrix} a2 & b2 & c2 \\ d2 & e2 & f2 \\ g2 & h2 & i2 \end{pmatrix} \begin{pmatrix} R2 \\ G2 \\ B2 \end{pmatrix} \quad \text{Equation 2}$$

third converting means for converting a color value (R1, G1, B1) in the first RGB color space to a color value (R2, G2, B2) in the second RGB color space by means of the following Equation 3, using a matrix $L=N^{-1}M$ calculated in advance on the basis of a matrix M and matrix N, $$\begin{pmatrix} R2 \\ G2 \\ B2 \end{pmatrix} = L \begin{pmatrix} R1 \\ G1 \\ B1 \end{pmatrix} = \begin{pmatrix} a3 & b3 & c3 \\ d3 & e3 & f3 \\ g3 & h3 & i3 \end{pmatrix} \begin{pmatrix} R1 \\ G1 \\ B1 \end{pmatrix} \quad \text{Equation 3}$$

determining means for determining whether the three relationships a1+b1+c1=a2+b2+c2, d1+e1+f1=d2+e2+f2, and g1+h1+i1=g2+h2+i2 are true for a color value of the XYZ color space derived by converting a color value (1, 1, 1) representing the white point of the first RGB color space by means of the first converting means, and a color value of the XYZ color space derived by converting a color value (1, 1, 1) representing the white point of the second RGB color space by means of the second converting means, deviation calculating means that, in the event it is determined that the three relationships are true, calculates deviation of a color value (1, 1, 1) representing the white point of the second RGB color space with respect to a converted color value (a3+b3+c3, d3 +e3 +f3, g3 +h3 +i3), converted by the third converting means from a color value (1, 1, 1) representing the white point of the first RGB color space to a color value of the second RGB color space, and first correcting means for correcting the coefficients of the matrix L so as to eliminate the calculated deviation.

The color space converting apparatus according to the sixth aspect of the present invention may further comprise second correcting means that, in the event that it is determined that at least one relationship of the three relationships is not true, corrects the matrix N, or third correcting means that corrects the matrix M.

The sixth aspect of the present invention may also be provided as a method of color space conversion or a color space converting program. In either case sixth aspect of the present invention can give working effects similar to those of the fourth aspect of the present invention, and like fourth aspect of the present invention, it can be realized through various aspects.

A seventh aspect of the present invention provides a method for manufacture of a color space conversion matrix for converting a color value of a first color space to a color value of a second color space. The method for manufacture of a color space conversion matrix according to the seventh aspect of the present invention is characterized in that a matrix operation using a matrix is executed to convert the color value of the white point of the first color space to the color value of the white point of the second color space; deviation between the color value of the second color space obtained by executing the matrix operation and the color value of the achromatic color of the second color space is calculated; the matrix is corrected to reflect the calculated deviation so as to match the converted color value of the second color space with the color value of the achromatic color of the second color space, to calculate a corrected matrix; and the calculated matrix is stored in storage means.

The achromatic color of the second color space may be white (white point). According to the method for manufacture of a color space conversion matrix pertaining to the seventh aspect of the present invention, when converting a color value of a first color space to a color value of a second color space, color values for achromatic color (white point) may be made to match. Also, the accuracy accompanying color space conversion can be improved.

An eighth aspect of the present invention provides a method for manufacture of a color space conversion table for converting a color value of a first color space to a color value of a second color space. The eighth aspect of the present invention is characterized in that a matrix operation is executed to convert the color value of the white point of the first color space to the color value of the white point of the second color space; deviation between the color value of the second color space obtained by executing the matrix operation and the color value of the achromatic color of the second color space is calculated; the matrix is corrected to reflect the calculated deviation so as to match the converted color value in the second color space with the color value of the achromatic color of the second color space; a matrix operation using the calculated matrix is executed to convert a plurality of color values of the first color space to a plurality of color values of the second color space; a color space conversion table associating the plurality of color values of the first color space with the plurality of color values of the second color space is created; and the created color space conversion table is stored in storage means.

The achromatic color of the second color space may be white (white point). According to the method for manufacture of a color space conversion table pertaining to the eighth aspect of the present invention, when converting a color value of a first color space to a color value of a second color space, color values for achromatic color (white point) may be made to match. Also, the accuracy accompanying color space conversion can be improved.

DETAILED DESCRIPTION OF THE PREFERRED EMBODIMENTS

Figure 1:
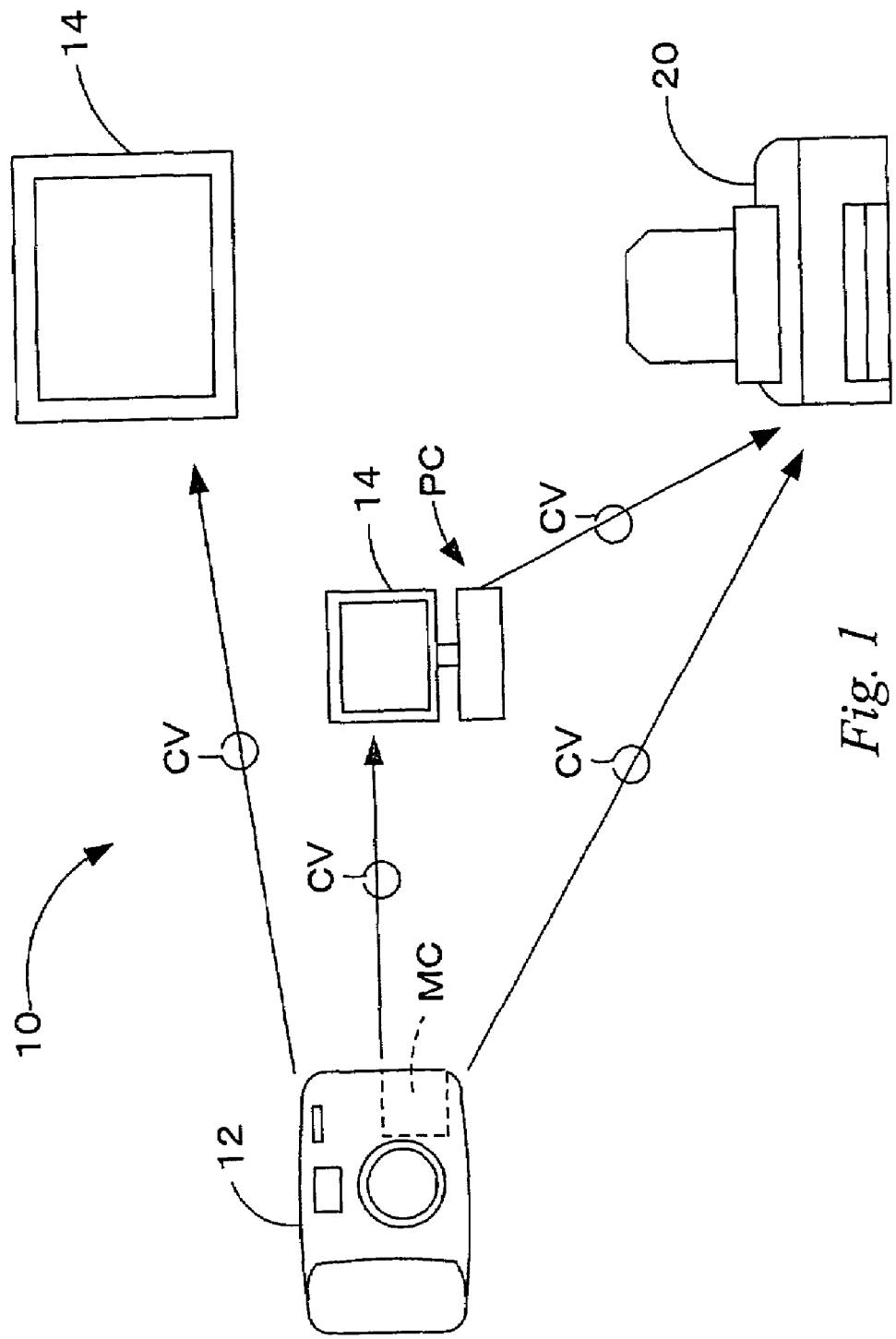
FIG. 1 is an illustrative diagram showing an example of an image data output system in which the image output apparatus device in accordance with a first embodiment may be implemented.
Figure 2:
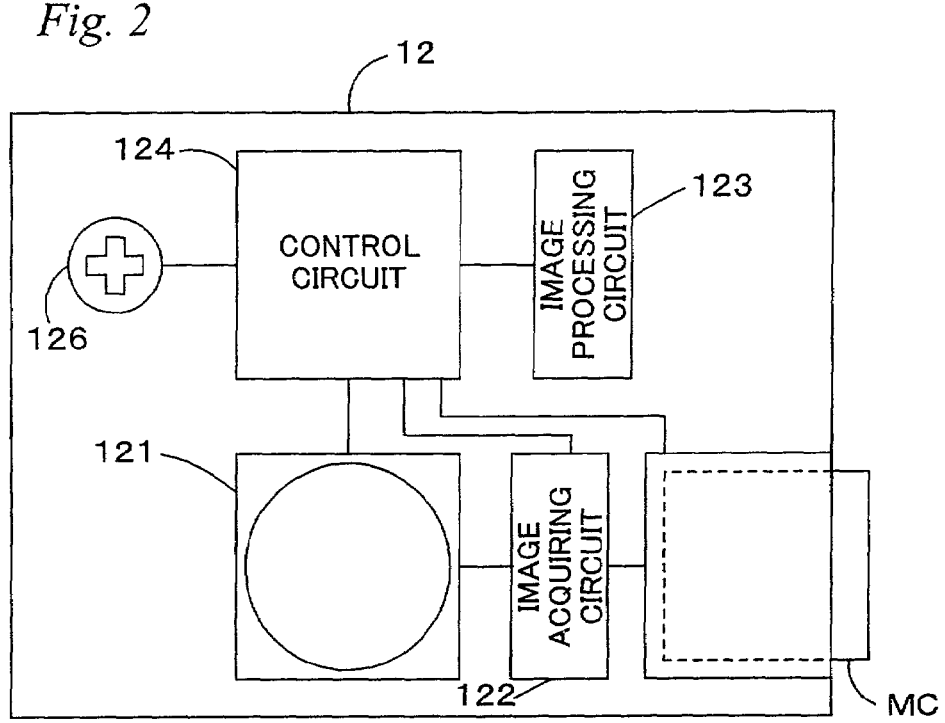
FIG. 2 is a block diagram showing a simplified arrangement of a digital still camera capable of generating an image file (image data) for output by the image output apparatus in accordance with the first embodiment.

The color space converting apparatus pertaining to the present invention, embodied as an image output apparatus, is described hereinbelow based on some examples in the order hereinbelow while referring to the drawings.
A. Arrangement of color value output system including image output apparatus in accordance with the first embodiment
B. Arrangement of image output apparatus
C. Image processing, including color space conversion processing, in image output apparatus
D. The second embodiment A. Arrangement of Image Data Output System Including Image Output Apparatus in Accordance with the First Embodiment The arrangement of an image data output system permitting implementation of the image processing apparatus device pertaining Example 1 is described with reference to FIGS. 1 and 2. FIG. 1 is an illustrative diagram showing an example of an image data output system in which the image output apparatus device in accordance with the first embodiment may be implemented. FIG. 2 is a block diagram showing a simplified arrangement of a digital still camera capable of generating an image file (image data) for output by the image output apparatus in accordance with the first embodiment.

Image output system 10 comprises a digital still camera 12 as an input device for generating an image file; and a color printer 20 as an output device for performing image processing on the basis of an image file generated by digital still camera 12, and outputting an image. As the output apparatus there could be used, besides a printer 20, a CRT display, LCD display, or other such monitor 14, a projector, or the like. In the description hereinbelow it shall be assumed that a color printer 20 is used as the output apparatus.

Digital still camera 12 is a camera that acquires an image by means of imaging light information with a digital device (e.g. a CCD or photomultiplier); as shown in FIG. 2 it comprises an optical circuit 121 for gathering light information, an image acquisition circuit 122 for controlling the digital device to acquire an image, an image processing circuit 123 for processing the acquired digital image; and a control circuit 124 for controlling the various circuits. Digital still camera 12 stores the acquired image as digital data in a memory card MC as the storage apparatus. As the storage format for image data in digital still camera 12, the JPEG format is typical, but other storage formats could be used, such as TIFF format, GIF format, BMP format, RAW format or the like. Digital still camera 12 also comprises a Select/Set button 126 for setting various functions.

Typically, where image data is stored in JPEG format, digital still camera 12 first generated image data (color values) in the sRGB color space, and executes a matrix S inverse operation, described later, to convert the color space of the color values from the sRGB color space to a YCbCr color space. This is because the YCbCr color space has color space characteristics suited to data compression.

The digital still camera 12 used in this image data output system 10 stores image data plus appended information as an image file on memory card MC. The image file generated by digital still camera 12 typically has a file structure according to the digital still camera image file format standard (Exif) in order to preserve image file compatibility. The Exif file specifications are laid down by the Japan Electronics and Information Technologies Industries Association (JEITA).

Figure 3:
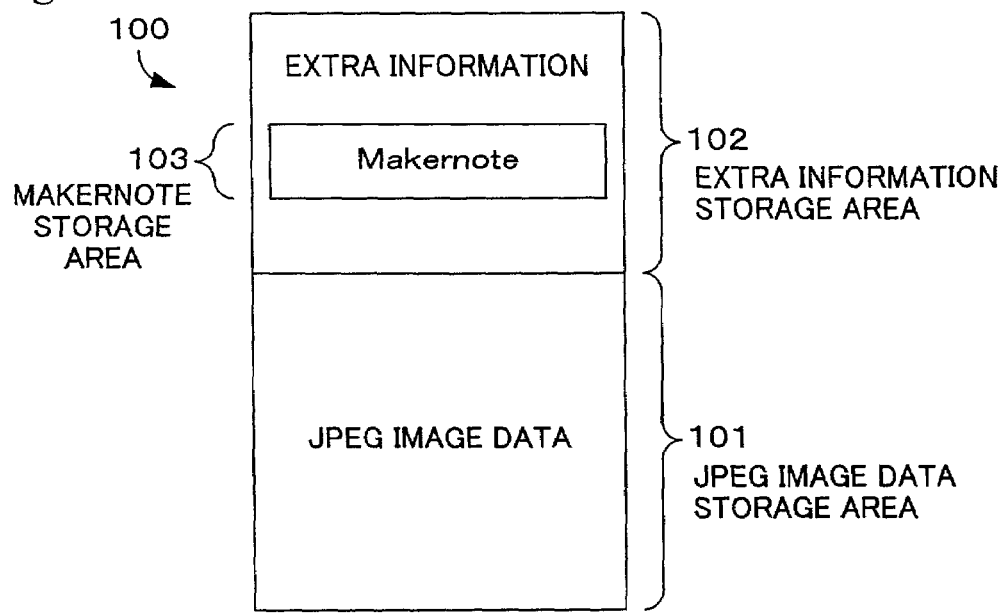
FIG. 3 is an illustrative diagram showing conceptually an internal structure for an image file 100 stored in Exif file format.

The simplified structure in an image file where it has a file format in accordance with the Exif file format is described with reference to FIG. 3. FIG. 3 is an illustrative diagram showing conceptually an internal structure for an image file 100 stored in Exif file format. The terms file structure, data structure and storage area in this example mean a file or data image in a state wherein a file or data etc. is stored in a storage apparatus.

As an Exif file, image file 100 contains a JPEG image data storage area 101 for storing image data in JPEG format, and an extra information storage area 102 for storing extra information of various kinds relating to the stored JPEG image data. The extra information storage area 112 contains, in TIFF format, photographic information relating to JPEG image photographic conditions such as color space at the time of shooting, shooting date, exposure, shutter speed, etc., and thumbnail image data for JPEG images stored in JPEG image data storage area 101. When image data is written to the memory card MC, this extra information is automatically stored in the extra information storage area 102. The extra information storage area 102 is also provided with a Makernote data storage area 103, an undefined area currently left available by DSC manufacturers; the Makernote data storage area 103 can be used by a DSC manufacturer to store any desired information. It is common knowledge to practitioners of the art that files of the Exif format use tags to designate data of various kinds.

The Makernote data storage area 103 is also provided with an arrangement whereby stored data can be identified by means of tags; in this example, there is stored device control information (image processing control information) for controlling image processing in color printer 20.

The control information is information for designating image output conditions so as to achieve optimal image output results, considering the image output characteristics of an output apparatus such as color printer 20 or the like. Information stored as control information includes information designating image output conditions in an output apparatus, and information designating conditions for applying characteristics to output in an output apparatus. Information designating output conditions includes parameters relating to, for example, gamma value and target color space. Information relating to color space is included also as a Color-Space tag in the extra information, but color space information included in the extra information is color space information at the time of creation of the image data (color values), while color space information included in the control information is information for color space during of arbitrarily designatable (settable) image processing. Information applying characteristics to output includes parameters relating, for example, to contrast, color balance adjustment, sharpness, and color correction. Color space conversion processing in this example can be executed using either color space information at the time of image creation or color space information for use during image processing, but in the following description, it is assumed that color space information at the time of image creation is used.

An image file generated by digital still camera 12 is sent to color printer 20, for example, via a cable CV and a computer PC, or via cable CV. Or, the image file is sent to color printer 20 via a computer PC connected to the memory card MC installed in the digital still camera 12, or the memory card MC directly to printer 20. In the description hereinbelow, the description is based on the case of the memory card MC being connected directly to color printer 20.

B. Arrangement of Image Output Apparatus

Figure 4:
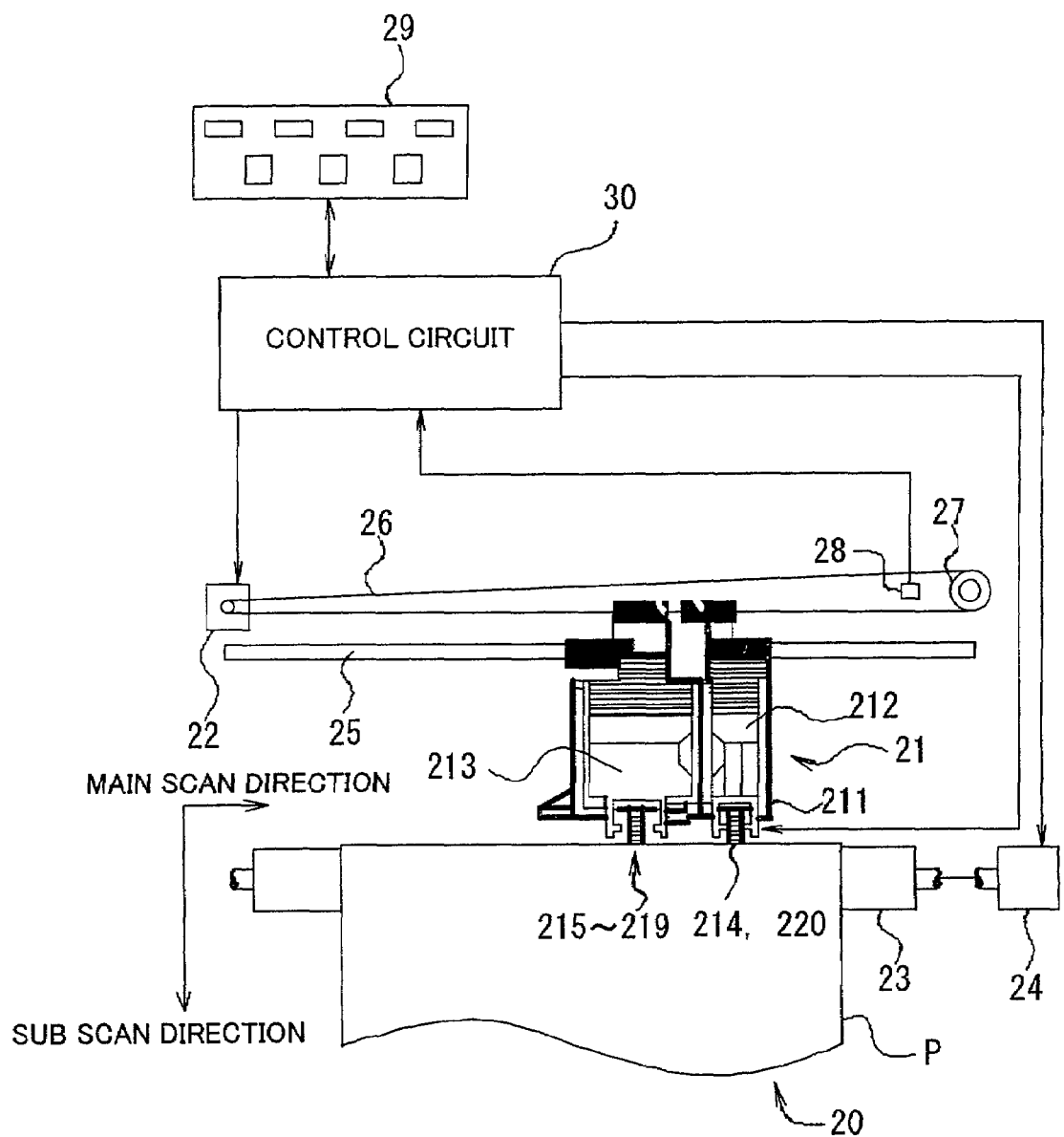
FIG. 4 is a block diagram showing the general arrangement of a color printer 20 in accordance with the first embodiment.

The general arrangement of the image output apparatus pertaining to Example 1, namely, a color printer 20, is described with reference to FIG. 4. FIG. 4 is a block diagram showing the general arrangement of a color printer 20 in accordance with the first embodiment.

Color printer 20 is a printer capable of color image output and is a printer of inkjet type that forms an image by ejecting inks of, for example, the four colors of cyan (C), magenta (M), yellow (Y) and black (K), onto a print medium to produce a dot pattern, or it is a printer of electrophotographic type that transfer/fixes color toner onto a print medium to produce an image. For the colored inks, besides the aforementioned four colors, light cyan (LC), light magenta (LM), or dark yellow (DY) colored inks may also be used.

As shown in the drawing, color printer 20 comprises a mechanism for driving a print head 211 conveyed on a carriage 21 to perform ink ejection and dot formation, a mechanism for causing reciprocating motion of this carriage 21 in the axial direction of a platen 23 by means of a carriage motor 22, a mechanism for advancing the printer paper P by means of a paper feed motor 24, and a control circuit 30. The mechanism for causing reciprocal motion of carriage 21 in the axial direction of platen 23 comprises a slide rail 25 extending parallel to the axis of platen 23 for slidably retaining cartridge 21, a pulley 27 having an endless drive belt 26 extending between it and carriage motor 22, a position sensor 28 for sensing the home position of carriage 21, and the like. The mechanism for advancing printer paper P comprises a platen 23, a paper feed motor 24 for causing platen 23 to rotate, an auxiliary paper feed roller (not shown), and a gear train (not shown) for transmitting rotation of paper feed motor 24 to platen 23 and the auxiliary paper feed roller.

Control circuit 30, while exchanging signals with the control panel 29 of the printer, appropriately controls operation of paper feed motor 24, carriage motor 22, and print head 211. Printer paper P supplied to color printer 20 is set so as to be pinched between platen 23 and the auxiliary paper feed roller, and is advanced by predetermined increments depending on the angle of rotation of platen 23.

An ink cartridge 212 and ink cartridge 213 are installed on carriage 21. Ink cartridge 212 contains black (K) ink, while ink cartridge 213 contains other inks, specifically, inks of the three colors of cyan (C), magenta (M), yellow (Y), plus light cyan (LC), light magenta (LM), and dark yellow (DY), for a total of six colored inks.

Figure 5:
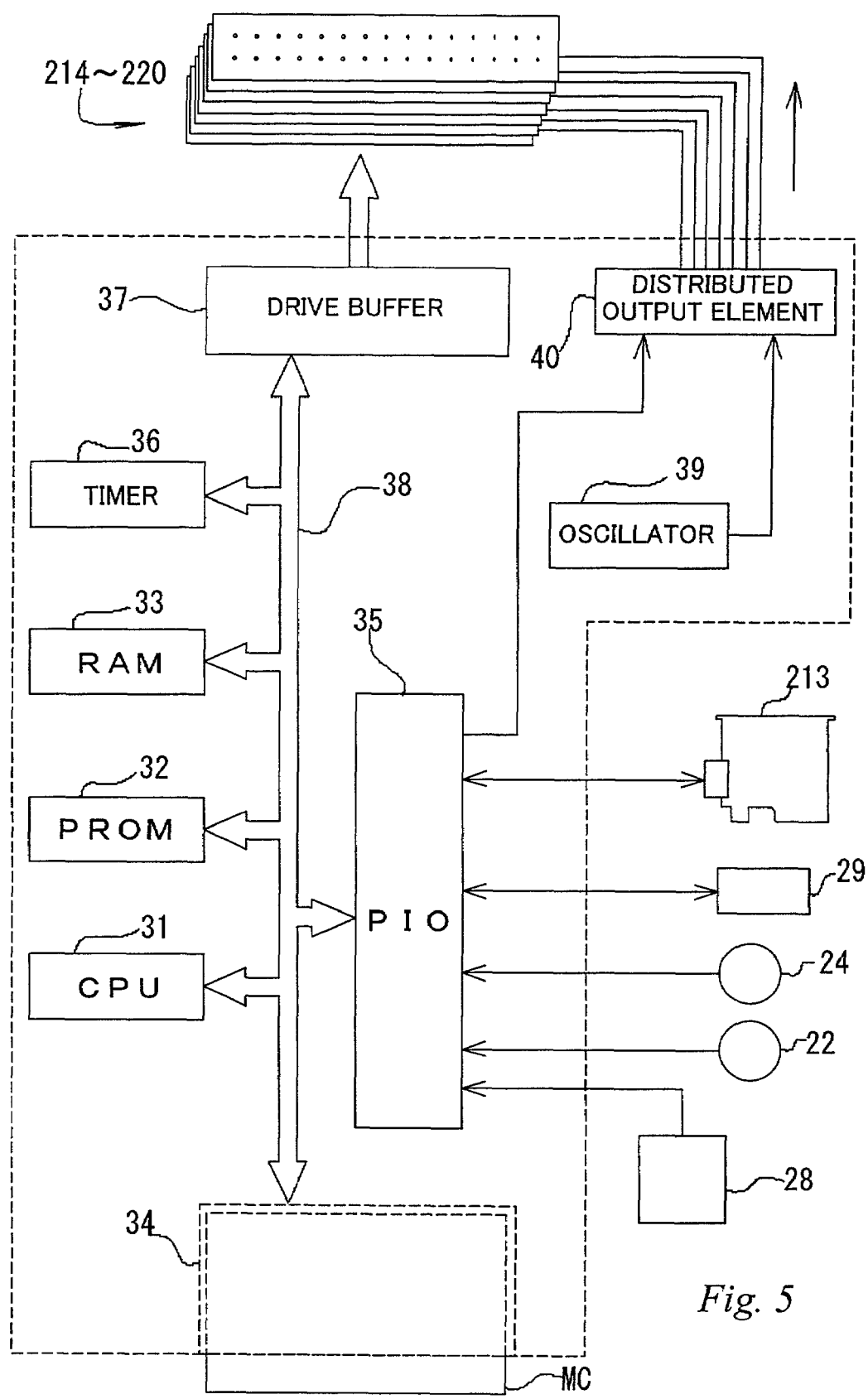
FIG. 5 is an illustrative diagram showing the internal arrangement of a control circuit 30 of color printer 20.

The internal arrangement of control circuit 30 of color printer 20 is described with reference to FIG. 5. FIG. 5 is an illustrative diagram showing the internal arrangement of a control circuit 30 of color printer 20. As shown in the drawing, control circuit 30 comprises a CPU 31; PROM 32; RAM 33; a PCMCIA slot 34 for acquiring data from a memory card MC; a peripheral I/O portion (PIO) 35 for performing exchange of data with paper feed motor 24, carriage motor 22 etc., a timer 36, a drive buffer 37 and the like. Drive buffer 37 is used as a buffer for supplying dot ON/OFF signals to ink ejecting heads 214-220. These are interconnected by means of a bus 38 to enable exchange of data among them. Control circuit 30 additionally comprises an oscillator 39 for outputting a drive waveform of predetermined frequency, and a distributed output instrument 40 for distributing output from oscillator 39 to ink ejecting heads 214-220 at predetermined timing.

Control circuit 30 reads out an image file 100 from memory card MC, analyzes the extra information, and executes image processing based on the analyzed control information Al. Control circuit 30 outputs dot data to drive buffer 37 at predetermined timing while synchronizing with operation of paper feed motor 24 and carriage motor 22. The detailed flow of image processing executed by control circuit 30 is described hereinbelow.

Figure 6:
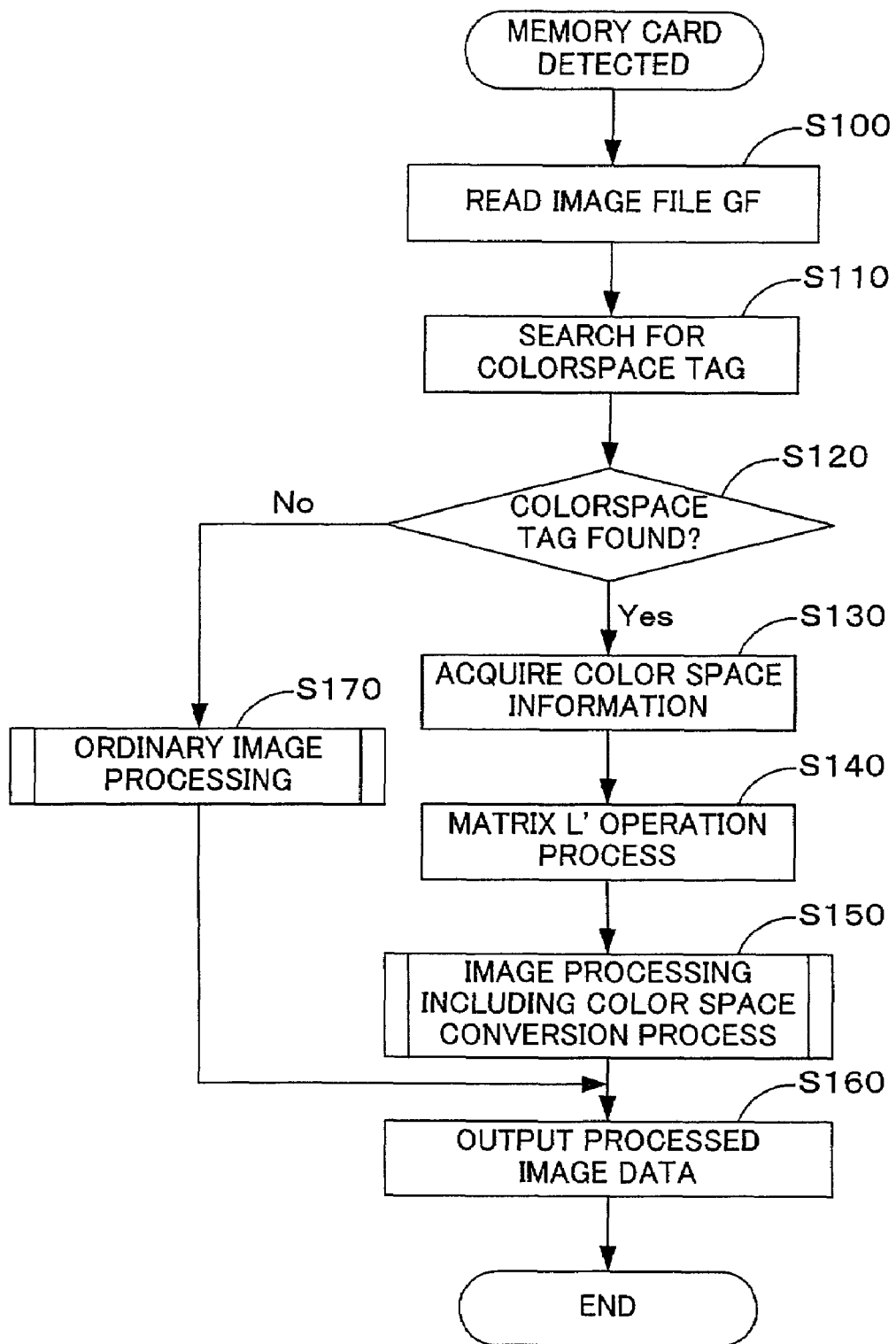
FIG. 6 is a flow chart showing a processing routine for print processing in a color printer 20 in accordance with the first embodiment.
Figure 7:
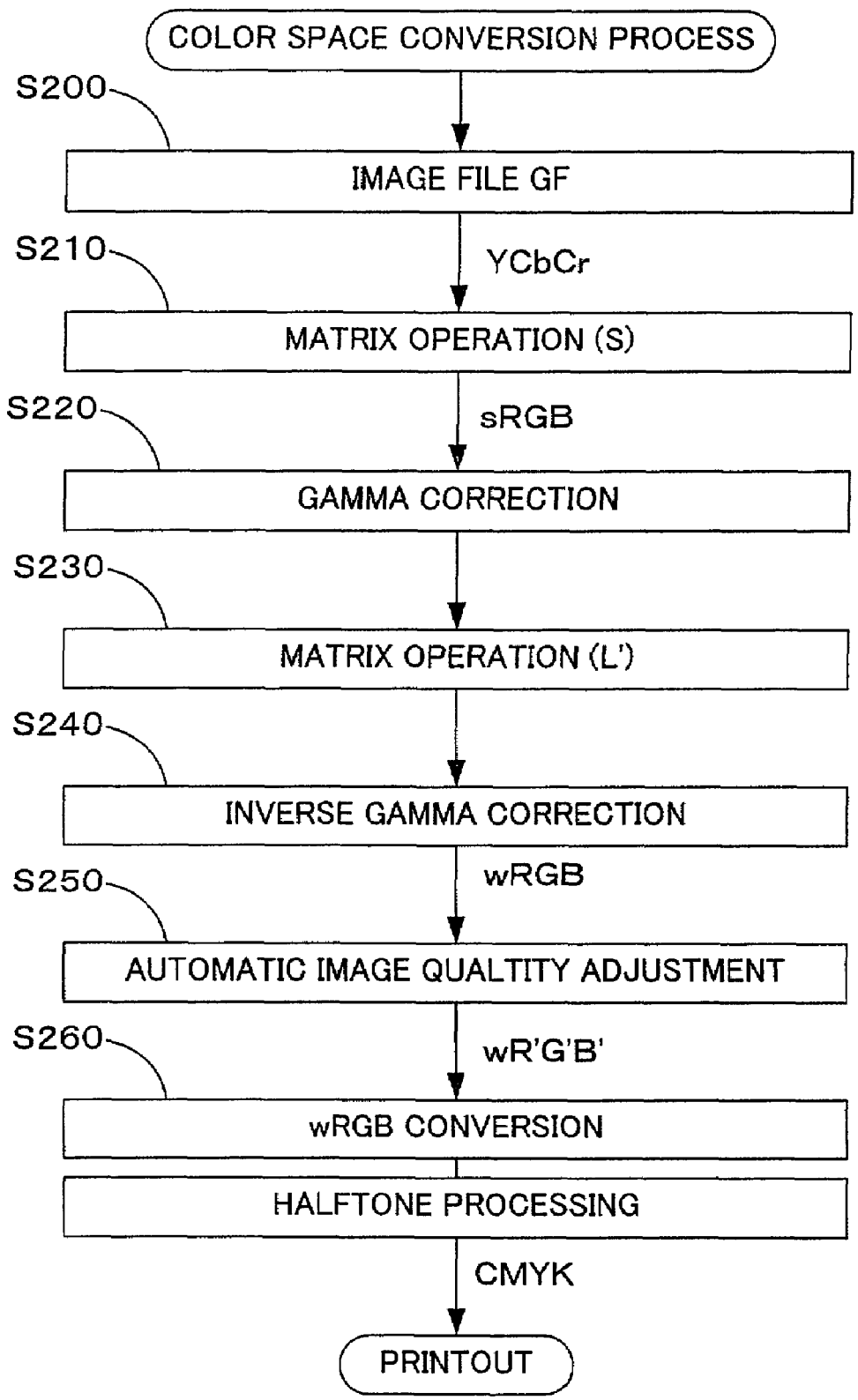
FIG. 7 is a flow chart showing the flow of image processing in a color printer 20 in accordance with the first embodiment.

C. Image Processing, Including Color Space Conversion Processing, in Image Output Apparatus Image processing in the color printer 20 pertaining to Example 1 is now described with reference to FIG. 6 and FIG. 7. FIG. 6 is a flow chart showing a processing routine for print processing in a color printer 20 in accordance with the first embodiment. FIG. 7 is a flow chart showing the flow of image processing in a color printer 20 in accordance with the first embodiment. In the following description the sRGB color space is designated as color space information.

When a memory card MC is inserted in slot 34, the control circuit 30 (CPU 31) of printer 20 reads out the image file 100 from memory card MC, and temporarily places the read out image file 100 in RAM 33 (STEP 100). CPU 31 searches for the ColorSpace tag, which indicates the color space at the time of image data creation, from the extra information storage area 102 of image file 100 (Step S110). If CPU 31 successfully searches/finds the ColorSpace tag (Step S120: Yes), it acquires and analyzes the color space information at the time of image data creation (Step S130). On the basis of the analyzed color space information, CPU 31 executes a process to correct the matrix L used in the color space conversion process, described later, to calculate a matrix L' (Step S140). The calculation procedure for matrix L' is described in detail later. CPU 31 executes an image process including a color space conversion process using the matrix L' calculated by means of correction (Step S150) and prints out the processed image data (Step S160).

If CPU 31 has not searched/found a ColorSpace tag (Step S120: No), the color space defining the image data (color values) cannot be determined, so it acquires from ROM 32 color space information held as default values by color printer 20, for example, information for the sRGB color space, and executes ordinary image processing (STEP S170). CPU 31 prints out the processed image data (Step S160) and terminates the processing routine.

Next, the calculation procedure for matrix L' used during the color space conversion process in this example is described. In the description of the color space conversion process, the term color value is used instead of image data. Matrix $L'=(N^{-1}M)'$ is a matrix for color space conversion, used in a matrix operation equation during conversion of a color value of a first color space to a color value of a second color space. As will be described later, matrix $L'=(N^{-1}M)'$ is obtained by executing a correction process on a matrix $L'=N^{-1}M$. Typically, when converting a color space that represents (defines) color values, in order to match color reproduction in the color space of the conversion source with color reproduction in the color space of the conversion destination, conversion is performed through the agency of a device-independent color space (machine-independent color space) that is not dependent on a particular device such as a DSC or printer, for example, an XYZ color space. The commonly used RGB color space is a device-dependent color space dependent on a device, and is defined for each individual device, so in order to correctly reproduce colors in another device, it is necessary to perform color matching so that the same values are always assumed in the XYZ color space or other such device-independent color space. Following is a description of a matrix M and a matrix N.

In this example, in order to convert a color value of a first color space, for example, an RGB color space, into a color value of the XYZ color space, a matrix operation M is executed using a matrix M. When executing matrix operation M, CPU 31 refers to the ColorSpace tag to reflect the color space at the time the color value was created, uses the written in color space information to set the matrix values of matrix (M), and executes the matrix operation. A color space such as the sRGB color space or NTSC color space may be used at this time. The matrix operation M using a matrix M is, for example, the operation equation given below.

$$\begin{pmatrix} X \\ Y \\ Z \end{pmatrix} = M \begin{pmatrix} Rs \\ Gs \\ Bs \end{pmatrix}$$

$$M = \begin{pmatrix} a1 & b1 & c1 \\ d1 & e1 & f1 \\ g1 & h1 & i1 \end{pmatrix} = \begin{pmatrix} 0.4124 & 0.3576 & 0.1805 \\ 0.2126 & 0.7152 & 0.0722 \\ 0.0193 & 0.1192 & 0.9505 \end{pmatrix}$$

To date, the color space used during image processing in printers and computers has been fixed to sRGB, and thus even where a digital still camera 12 is capable of creating color values based on a wider color space, for example, NTSC, it has not been possible to effectively utilize the wider color space. According to the present embodiment, however, there is used a printer (printer driver) that uses the color space information at the time of color value creation, described in the extra information of the image file, to modify values in the matrix (M) for the matrix operation M used during image processing. Accordingly, even where digital still camera 12 creates color values in the NTSC color space, one of the RGB color spaces having wider space than the sRGB color space, the color space in which the color values were created can be utilized effectively to allow correct color reproduction to be realized.

Figure 8:
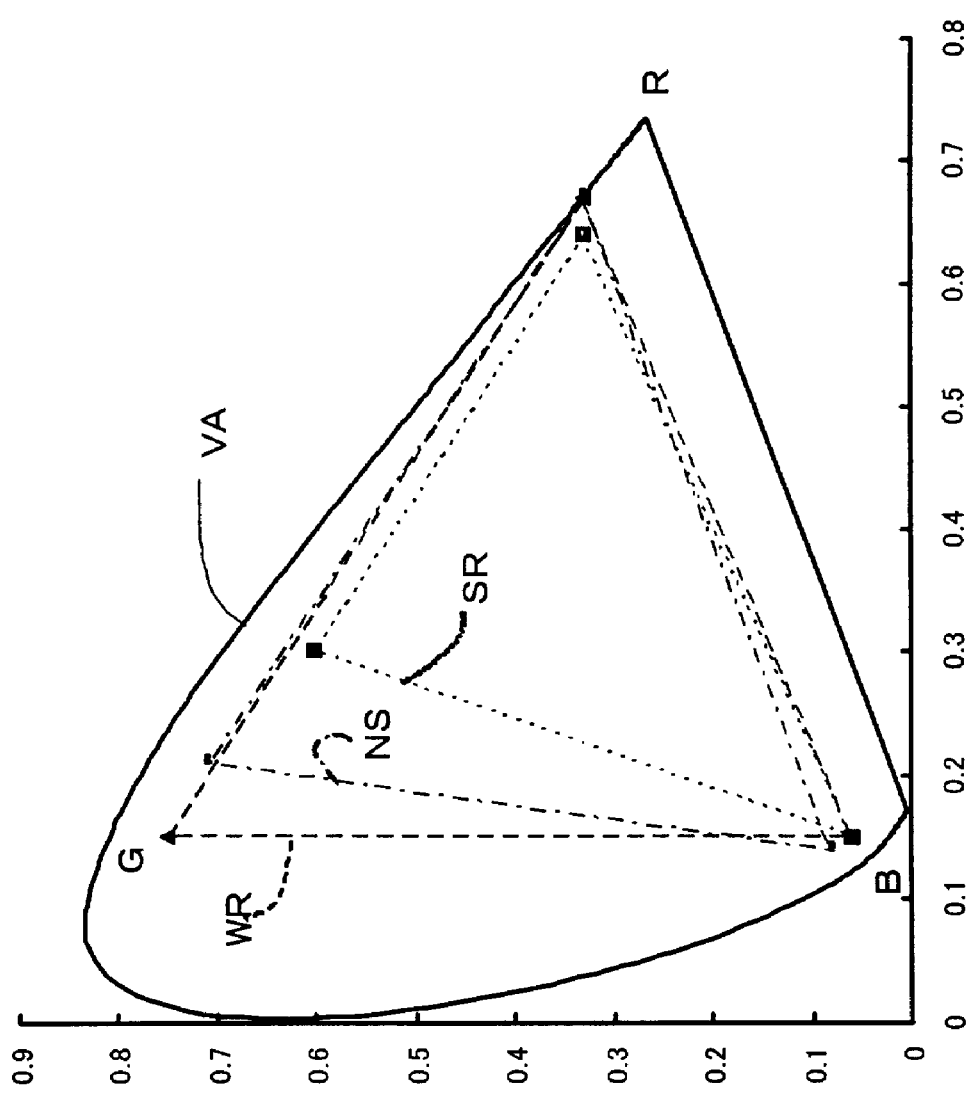
FIG. 8 is an illustrative diagram showing the color space areas of visible area (V), sRGB (SR), NTSC (NS) and wRGB (WR) on an RGB color space.

In this example, in order to convert a color value based on a second color space, for example the wRGB color space, to a color value based on the XYZ color space, that is, in order to associate a color value based on the wRGB color space with a color value based on the XYZ color space, a matrix operation N using matrix N is executed. As shown in FIG. 8, the wRGB color space is a wider color space than the sRGB color space. The matrix operation N using a matrix N is, for example, the operation equation given below.

$$\begin{pmatrix} X \\ Y \\ Z \end{pmatrix} = N \begin{pmatrix} Rw \\ Gw \\ Bw \end{pmatrix}$$

$$N = \begin{pmatrix} a2 & b2 & c2 \\ d2 & e2 & f2 \\ g2 & h2 & i2 \end{pmatrix} = \begin{pmatrix} 0.5767 & 0.1856 & 0.1882 \\ 0.2973 & 0.6274 & 0.0753 \\ 0.0270 & 0.0707 & 0.9913 \end{pmatrix}$$

For the sRGB color space and wRGB color space in this example, color values of white points (illumination light source) based on each of the two color spaces assume the same value in the XYZ color space. That is, between the color value of the white point based on the sRGB color space (Rs, Gs, Bs)=(1.0000, 1.0000, 1.0000) and the color value of the white point based on the wRGB color space (Rw, Gw, Bw)=(1.0000, 1.0000, 1.0000), the relationships a1+b1+c1=a2+b2+c2, d1+e1+f1=d2+e2+f2, and g1+h1+i1=g2+h2+i2 are true. Specifically applying the example matrices M, N, the color value of a white point based on the sRGB color space (Rs, Gs, Bs)=(1.0000, 1.0000, 1.0000) is converted by means of matrix operation M to a color value having the value (X, Y, Z)=(0.9505, 1.0000, 1.8090), and the color value of a white point based on the wRGB color space (Rw, Gw, Bw)=(1.0000, 1.0000, 1.0000) is converted by means of matrix operation N to a color value having the values (X, Y, Z)=(0.9505, 1.0000, 1.8090). Accordingly, the color value of the white point based on the sRGB color space and the color value of the white point based on the wRGB color space are correctly associated through the agency of the XYZ color space.

By sequentially executing matrix operation M using matrix M and matrix operation $N^{-1}$ using matrix $N^{-1}$, a color value of the sRGB color space can be converted to a color value of the wRGB color space, but the operation process time will be prolonged. Accordingly, a matrix L ($N^{-1}M$) operation using a pre-calculated matrix ($N^{-1}M$) is executed when converting a color value of the sRGB color space to a color value of the wRGB color space. The matrix operation L using matrix L is, for example, the operation equation given below.

$$\begin{pmatrix} Rw \\ Gw \\ Bw \end{pmatrix} = L \begin{pmatrix} Rs \\ Gs \\ Bs \end{pmatrix}$$

$$L = N^{-1}M = \begin{pmatrix} aL & bL & cL \\ dL & eL & fL \\ gL & hL & iL \end{pmatrix} = \begin{pmatrix} 0.7152 & 0.2848 & 0.0001 \\ 0.0000 & 1.0001 & 0.0000 \\ 0.0000 & 0.0412 & 0.9588 \end{pmatrix}$$

When the color value of a white point based on the sRGB color space (Rs, Gs, Bs)=(1.0000, 1.0000, 1.0000) is converted by means of matrix operation L to a color value based on the wRGB color space, the value (Rw, Gw, Bw)=(1.0001, 1.0001, 1.0000) is obtained. Therefore, the color value of a white point based on the sRGB color space will not convert correctly to the color value of a white point based on the wRGB color space. This is because, considering that number of effective decimal places in matrix M and matrix N is 4 places below the decimal point, in the process of calculating matrix L, the fifth decimal place below the decimal point is rounded, so that the effective decimal places are the four places below the decimal point. Using a greater number of effective decimal places will increase conversion accuracy, but the operation processing speed will be slower, so using matrix L becomes meaningless. On the other hand, in the sRGB color space, the color value represented as white (achromatic color: Rs=Bs=Gs) is not represented as achromatic color in the wRGB color space (Rs=Bs≠Gs), so gray balance is destroyed. As noted, human visual perception is extremely sensitive in the gray region, so any disturbance of gray balance will be visible to the eye.

In this example, a matrix L' having coefficients (aL', bL', cL', dL', eL', fL', gL', hL', iL') derived by correcting the coefficients of matrix L (aL, bL, cL, dL, eL, fL, gL, hL, iL) in the following manner is used to convert the color space of a color value from sRGB to wRGB, while preserving gray balance.

$E=aL=bL+cL-1.0$, $D=E/3$,

Here, Dm: value of effective decimal places D and above; Ds=D−Dm: value of effective decimal places below D; and De=E−3*Dm. Where the smallest unit of effective decimal place is S, De can assume the value 0, S, or 2*S. Depending on the value of De, the corrected values of aL, bL and cL, i.e., aL', bL' and cL', are calculated as follows.

De=0

$a'=aL-Dm,\ bL'=bL-Dm,\ cL'=cL-Dm$

De=S $aL'=aL-Dm,\ bL'=bL-Dm,\ cL'=cL-Dm-S$

De=2*S $aL'=aL-Dm,\ bL'=bL-Dm-S,\ cL'=cL-Dm-S$

Regarding parameters from which S is subtracted, subtraction is done in the order cL, bL, but the reverse order is acceptable as well. Error correction is executed in similar fashion for dL, eL, fL, gL, hL and iL.

Where the aforementioned correction method is used on matrix L in this example, the top row is $E=0.7152+0.02848+0.0001-1.0=0.0001$, $D=(0.0001)/3=0.0000333\ldots$, where effective decimal places are four places below the decimal point, Dm=0.0000, $Ds=0.0000333\ldots-0.0000=0.0000333\ldots$, $De=E-3*Dm=0.0001-0.0000=0.0001$, and

S=0.0001.

Thus, De=S, $aL'=aL-Dm=0.7152-0.0000=0.7152$, $bL'=bL-Dm=0.02848-0.0000=0.02848$, and $cL'=cL-Dm-S=0.0001-0.0000-0.0001=0.0000$.

The middle row is $$E = 0.0000 + 1.0001 + 0.0000 - 1.0 = 0.0001,$$

$$D = (0.0001)/3 = 0.0000333\ldots,$$

where effective decimal places are four places below the decimal point, $$Dm = 0.0000,$$

$$Ds = 0.0000333\ldots - 0.0000 = 0.0000333\ldots,$$

$$De = E - 3*Dm = 0.0001 - 0.0000 = 0.0001, \text{ and}$$

$$S = 0.0001.$$

Thus, De=S, $$dL' = dL - Dm = 0.0000 - 0.0000 = 0.0000,$$

$$eL' = eL - Dm = 1.0001 - 0.0000 = 1.0001, \text{ and}$$

$$fL' = fL - Dm - S = 0.0000 - 0.0000 - 0.0001 = -0.0001.$$

The bottom row is $$E = 0.0000 + 0.0412 + 0.9588 - 1.0 = 0.0000,$$

$$D = (0.0001)/3 = 0.0000,$$

where effective decimal places are four places below the decimal point, $$Dm = 0.0000,$$

$$Ds = 0.0000 - 0.0000 = 0.0000,$$

$$De = E - 3*Dm = 0.0000 - 0.0000 = 0.0000, \text{ and}$$

$$S = 0.0001.$$

Thus, De=S, $$gL' = gL - Dm = 0.0000 - 0.0000 = 0.0000,$$

$$eL' = eL - Dm = 0.0412 - 0.0000 = 0.0412, \text{ and}$$

$$fL' = fL - Dm = 0.9588 - 0.0000 = 0.9588.$$

Accordingly, the matrix L' derived by correcting matrix L is represented as follows.

$$L' = (N^{-1}M)' = \begin{pmatrix} 0.7152 & 0.2848 & 0.0000 \\ 0.0000 & 1.0001 & -0.0001 \\ 0.0000 & 0.0412 & 0.9588 \end{pmatrix}$$

When the color value of a white point based on the sRGB color space (Rs, Gs, Bs)=(1.0000, 1.0000, 1.0000) is converted to a color value based on the wRGB color space using matrix L', the value (Rw, Gw, Bw)=(1.0000, 1.0000, 1.0000) is obtained. Therefore, the color value of the white point based on the sRGB color space converts correctly to the color value of the white point based on the wRGB color space, so that the gray balance of the converted color value represented based on the wRGB color space can be preserved.

Image processing executed in color printer 20 is now described in detail with reference to FIG. 7. The control circuit 30 (CPU 31) of color printer 20 acquires image data GD from the read out image file GF (STEP S200). As noted, image data is stored as a JPEG format file, and in a JPEG file, the color space of the created image data (sRGB color space) is converted to the YCbCr color space for storage of the image data, in order to increase compression.

However, in a personal computer, printer or the like, typically only image data (color values) represented in the RGB color space can be handled, so it is necessary to the color space of color values represented in the YCbCr color space to the RGB color space.

CPU 31 executes a 3×3 matrix operation S to convert a color value in the YCbCr color space to a color value in the RGB color space (STEP S210). Matrix operation S is defined in the JPEG File Interchange Format (JFIF) standard. It is a matrix equation for converting the color space of color values from the YCbCr color space to the RGB color space, and is a matrix equation shown below. When converting from the YCbCr color space to the RGB color space, color values that are out-of-gamut (area) in the sRGB color space, that is, any data assuming a negative value as a color value, or data above 256 (in the case of 8-bit tone) is preserved as valid.

$$\begin{pmatrix} R \\ G \\ B \end{pmatrix} = S \begin{pmatrix} Y \\ Cb - 128 \\ Cr - 128 \end{pmatrix}$$

$$S = \begin{pmatrix} 1 & 0 & 1.40200 \\ 1 & -0.34414 & -0.71414 \\ 1 & 1.77200 & 0 \end{pmatrix}$$

CPU 31 performs gamma correction on RGB color space color values obtained in this way (STEP S220). When performing gamma correction, CPU 31 refers to the DSC side gamma value in the parameters mentioned earlier, and uses the set gamma value (DSC fixed value) to execute the gamma correction indicated below on the video data (gamma conversion process). In this example, image data can assume negative color values, so two operation equations, one for when a color value is a positive value and one for when it is a negative color value, are prepared, so that the multiplication to be used during gamma correction can be executed even when a color value is negative.

Rt,Gt,Bt≧0

$$Rs = \left(\frac{Rt}{255}\right)^\gamma \quad Gs = \left(\frac{Gt}{255}\right)^\gamma \quad Bs = \left(\frac{Bt}{255}\right)^\gamma$$

Rt,Gt,Bt<0

$$Rs = -\left(\frac{-Rt}{255}\right)^\gamma \quad Gs = -\left(\frac{-Gt}{255}\right)^\gamma \quad Bs = -\left(\frac{-Bt}{255}\right)^\gamma$$

CPU 31 executes a matrix operation $(N^{-1}M)$ using matrix $L' = (N^{-1}M)$ calculated in the manner described previously, on the color value that has been subjected to gamma correction (Step S230).

CPU 31 executes inverse gamma correction on the color value converted to a color value based on the wRGB color space (Step S240). When executing inverse gamma correction, CPU 31 refers to the color printer 20 side gamma value in the parameters mentioned earlier, and uses the inverse of the set gamma value to execute the inverse gamma correction indicated below on the color value (inverse gamma conversion process).

$$Rw' = \left(\frac{Rw}{255}\right)^{1/\gamma} \quad Gw' = \left(\frac{Gw}{255}\right)^{1/\gamma} \quad Bw' = \left(\frac{Bw}{255}\right)^{1/\gamma}$$

The color space of the color value obtained after executing matrix operation L' is the wRGB color space. As noted, this wRGB color space is a wider color space than the RGB color space, and basically corresponds to the RGB color space reproducible by a digital still camera 12.

CPU 31 performs automatic image adjustment to impart features to the image (STEP S250). Here, the process is a process performed in accordance with arbitrary information in the control information. When performing automatic image adjustment, CPU 31 refers to parameter values such as brightness, sharpness etc. in the parameters mentioned earlier, and uses these set parameter values to execute image adjustment on the video data. Where automatic adjustment parameters have been designated, parameter values designated by automatic adjustment parameters are the basis for reflecting other arbitrarily designated parameter values.

Where arbitrary information is designated by control information in the image file, since only automatic adjustment parameters are automatically appended on the digital still camera 12 side, CPU 31 executes image processing according to the automatic adjustment parameters.

CPU 31 performs a wRGB conversion process and halftone process for printing (STEP S260). In the wRGB conversion process, CPU 31 refers to a lookup table (LUT) for conversion to the CMYK color space, associated with the wRGB color space and stored in ROM 32, and converts the color space of the color value (image data) from the wRGB color space to the CMYK color space. Specifically, image data consisting of R·G·B tone values is converted, for example, to tone value data for each of six colors C·M·Y·K·LC·LM.

In halftone processing, the color-converted image data is received, and a tone number conversion process is performed. In this example, after color conversion image data is represented as data having 256 tones for each color. In contrast, with the color printer 20 of this example, only a state of either "dot on" or "dot off" can be assumed. That is, the printer 24 of this example can only represent two tones locally. So, image data having 256 tones is converted to image data represented by two tones, representable by the color printer 20. As a representative method for this two-toning (binarization) process, there is a method called the error diffusion method and a method called the systematic dithering method.

In color printer 20, before color conversion, in the event that the resolution of the image data is lower than the print resolution, linear interpolation is performed to create new data between adjacent image data, and conversely where higher than print resolution, data is thinned out, to perform resolution conversion processing to convert the resolution of the image data to the print resolution. Color printer 20 performs an interlacing process to line up image data converted to a specific expression format based on the dot on-off state in the order in which it will be sent to the color printer 20.

In this example, all image processing is executed in the color printer 20, and a dot pattern is formed on the print medium in accordance with generated image data, but all or some of image processing could instead be executed on a computer PC. In this case, it will be realized by providing an image data processing application installed on the hard disk etc. of computer PC with the image processing functions described with reference to FIG. 7. Image files created by a digital still camera 12 are provided to computer PC via a cable CV or via a memory card MC. On the computer PC, the application is run through user operation, and reading of the image file, analysis of extra information and control information, and conversion and adjustment of image data GD are executed. Or, by sensing insertion of a memory card MC or sensing insertion of a cable CV, the application can run automatically, and reading of the image file, analysis of extra information and control information, and conversion and adjustment of image data GD executed automatically.

According to image processing in color printer 20 according to Example 1 as described hereinabove, when converting color value color space from the sRGB color space to the wRGB color space, it is possible to improve accuracy of color space conversion, or maintain high accuracy of color space conversion. That is, since a matrix operation L' that uses a matrix L' derived by correcting gray balance error is executed, conversion of color value color space from the sRGB color space to the wRGB color space can be done while preserving gray balance with high accuracy of color space conversion. Therefore, it is possible to execute conversion of color space with good accuracy, and the gray area to which the human visual sense is most sensitive can be represented appropriately in both the sRGB color space and the wRGB color space.

Further, when converting color value color space from the sRGB color space to the wRGB color space, a precalculated matrix L' based on matrix M and matrix N is used, so the speed of color space conversion can be accelerated while preserving gray balance.

D. Image Processing, Including Color Space Conversion Processing in Accordance with the Second Embodiment The arrangement of the image output apparatus in accordance with the second embodiment is the same as the arrangement of the image output apparatus in accordance with the first embodiment, so the symbols used in the first embodiment are assigned to the constituent elements, and description thereof is omitted.

In the first embodiment, the description was based on the premise that the color value of the white point based on the first color space (sRGB color space) and the color value of the white point based on the second color space (wRGB color space) match in the XYZ color space. In contrast to this, in the second embodiment, there is featured the point of, where the color value of the white point based on the first color space and the color value of the white point based on the second color space do not match in the XYZ color space, correcting the color values of the white points based on both color spaces so as to match in the XYZ color space, and then executing a color space conversion process in accordance with the first embodiment.

Figure 9:
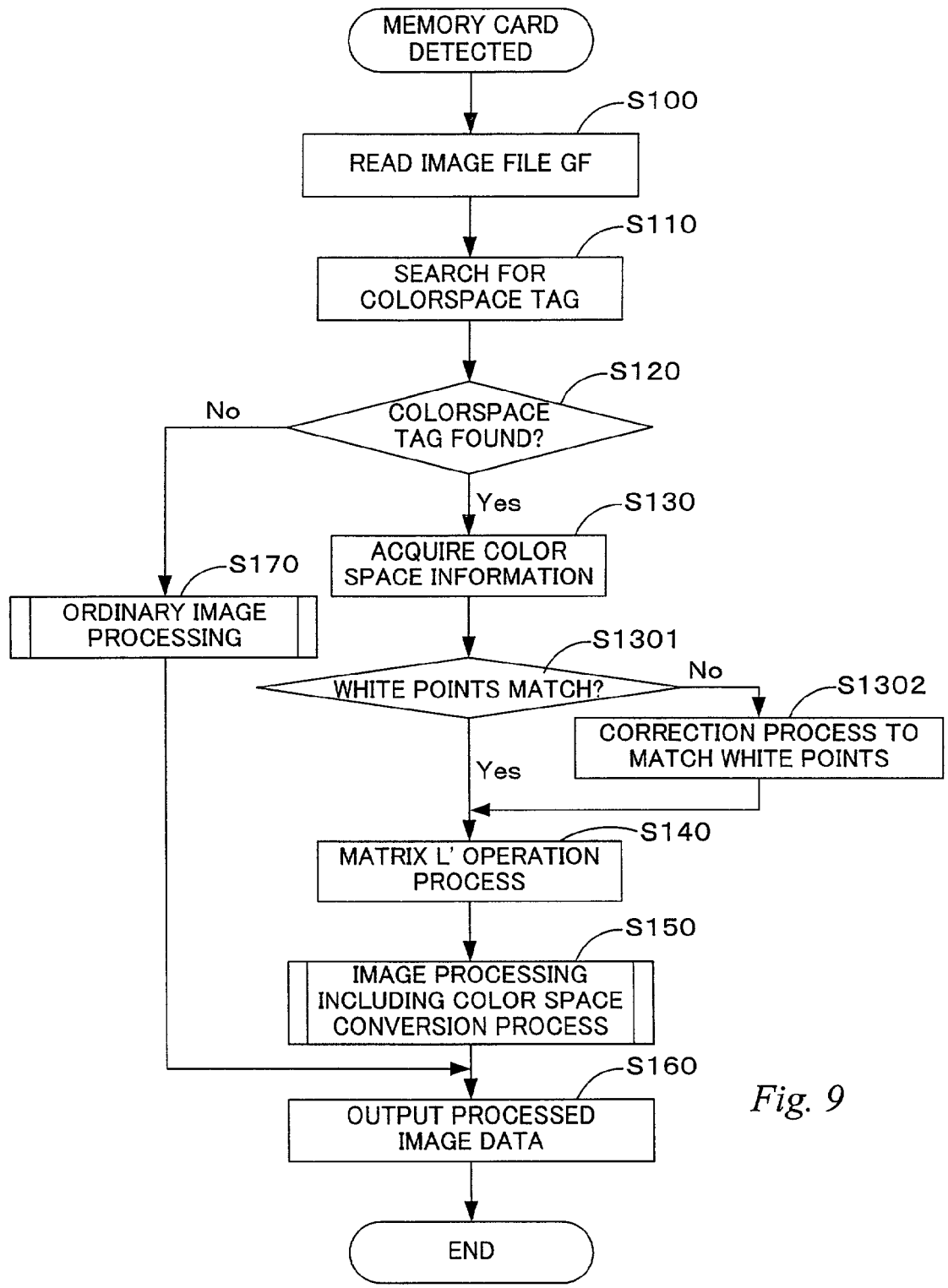
FIG. 9 is a flow chart showing a processing routine for print processing in a color printer 20 in accordance with a second embodiment.

Image processing in color printer 20 in accordance with the second embodiment is described with reference to FIG. 9. FIG. 9 is a flow chart showing a processing routine for print processing in a color printer 20 in accordance with the second embodiment.

When a memory card MC is inserted in slot 34, the control circuit 30 (CPU 31) of printer 20 reads out the image file 100 from memory card MC, and temporarily places the read out image file 100 in RAM 33 (STEP 100). CPU 31 searches for the ColorSpace tag, which indicates the color space at the time of image data creation, from the extra information storage area 102 of image file 100 (Step S110). If CPU 31 successfully searches/finds the ColorSpace tag (Step S120: Yes), it acquires and analyzes the color space information at the time of image data creation (Step S130).

CPU 31, using the analyzed color space information, determines whether the color value of the white point based on the first color space (sRGB color space) and the color value of the white point based on the second color space (wRGB color space) match in the XYZ color space (Step S1301). In the event that CPU 31 has determined that the color values of the white points based on both color spaces match in the XYZ color space (Step S1301: Yes), on the basis of the analyzed color space information executes a process to correct the matrix L used in the color space conversion process and calculate a matrix L', described later (Step S140).

If on the other hand CPU 31 has determined that the color values of the white points based on both color spaces do not match in the XYZ color space (Step S1301: No), it executes a correction process to match the color values of the white points based on both color spaces in the XYZ color space (Step S1302). This correction process is discussed later. CPU 31, after executing the correction process to match the white points, on the basis of the analyzed color space information executes a process to correct the matrix L used in the color space conversion process and calculate a matrix L', described later (Step S140). The determination as to whether the white points based on both color spaces match in the XYZ color space, as explained in Example 1, is determined by whether the relationships a1+b1+c1=a2+b2+c2, d1+e1+f1=d2+e2+f2, and g1+h1+i1=g2+h2+i2 are true.

CPU 31 executes an image process including a color space conversion process using the matrix L' calculated by means of correction (Step S150) and prints out the processed image data (Step S160). If CPU 31 has not searched/found a ColorSpace tag (Step S120: No), it acquires from ROM 32 color space information held as default values by color printer 20, for example, information for the sRGB color space, and executes ordinary image processing (STEP S170). CPU 31 prints out the processed image data (Step S160) and terminates the processing routine.

The correction process for matching white point is described. Where the tristimulus values in the sRGB color space are (Xs, Ys, Zs) and the tristimulus values of the corresponding color giving the same perception in the wRGB color space are (Xw, Yw, Zw), according to Vonkries rule the following relationship is true. Vonkries rule is a color conversion method that considers that when the illuminant light source (white point) differs, the human eye has the function of maintaining a fixed color perception for colors of different illumination (chromatic adaptation), and is a law that holds that where stimuli in the three types of cells in the cones of the human eye are L, M, N, the stimulus amount sensitivity is inversely proportional to the illuminant light source.

$$\begin{pmatrix} Xw \\ Yw \\ Zw \end{pmatrix} = (Mb^{-1}) \begin{pmatrix} Lww/Lws & 0 & 0 \\ 0 & Mww/Mws & 0 \\ 0 & 0 & Nww/Mws \end{pmatrix} (Mb) \begin{pmatrix} Xs \\ Ys \\ Zs \end{pmatrix}$$

Conversion from tristimulus values XYZ to cone level stimulus amounts L, M, N uses the following conversion matrix Mb, proposed by Bradford.

$$Mb = \begin{pmatrix} 0.8951 & 0.2664 & -0.1614 \\ -0.7502 & 1.7135 & 0.0367 \\ 0.0389 & -0.0685 & 1.0296 \end{pmatrix}$$

(Lws, Mws, Nws) and (Lww, Mww, Nww) are stimulus amounts of illumination (white) in the sRGB color space and wRGB color space, respectively; the case of converting color values in the sRGB color space to color values in the XYZ space by matrix M, described previously, and converting color values in the wRGB color space to color values in the XYZ space by matrix N, described previously is represented as follows.

$$\begin{pmatrix} Lws \\ Mws \\ Nws \end{pmatrix} = (M) \begin{pmatrix} a1+b1+c1 \\ d1+e1+f1 \\ g1+h1+i1 \end{pmatrix}$$

$$\begin{pmatrix} Lww \\ Mww \\ Nww \end{pmatrix} = (N) \begin{pmatrix} a2+b2+c2 \\ d2+e2+f2 \\ g2+h2+i2 \end{pmatrix}$$

Using relational equations according to the VonKries rule, the white point of the wRGB color space of the output color value side is corrected so as to match the white point of the sRGB color space of the input color value side.

As described hereinabove, according to the second embodiment, even if, for example, the white points of two color spaces, namely the sRGB color space and the wRGB color space, are different in the device-independent color space, by means of correction the white points of the two color spaces can be matched in the device-independent color space. Accordingly, the color space conversion process described in the first embodiment can be implemented, and the effects obtained in the first embodiment can be obtained.

In the second embodiment, the output color value side white point converted from the RGB color space to the XYZ color space is corrected to match the white point of the input side white point converted from the RGB color space to the XYZ color space, but correction may be performed during conversion of color value color space from the RGB color space to the XYZ color space. That is, the coefficients of matrix M or matrix N may be corrected to match the white point of the input color value side in the XYZ color space to the white point of the output color value side in the XYZ color space, or to match the white point of the output color value side in the XYZ color space to the white point of the input color value side in the XYZ color space. This is because in either case, there is no change in the ability to match the white points of the two color spaces in the XYZ color space.

E. Other Embodiments

In the preceding embodiments, a matrix L' for converting color space is calculated dynamically and color space conversion processing is performed, but color space conversion processing could be executed using a precalculated matrix L', or using a color conversion table storing color conversion results by matrix L' for a plurality of color values. Where a predetermined matrix L' is used, a plurality of matrices L' for each combination of first color space and second color space are calculated, and depending on the image file GF to be processed a suitable matrix L' is selected from the plurality of matrices L'. Where a color conversion table is used, for an arbitrary matrix L', each matrix L' is used to convert a plurality of arbitrary color values based on a first color space to a plurality of color values based on a second color space, and a color conversion table that associates color values based on the second color space obtained by the conversion with a plurality of arbitrary color values based on the first color space is created. During the color space conversion process, depending on the combination of first color space and second color space, one color conversion table from among a plurality of color conversion tables is selected, and color conversion processing is executed using the selected color conversion table.

With either method, whether to convert the color space defining image data GD from a first color space to a second color space is an arbitrarily selected item, but where matrix L' is generated dynamically, any color space can be dealt with, and color conversion with good accuracy can be realized. Where a predetermined matrix L' is used, fewer memory resources are needed to store matrix L", and high speed color conversion processing can be realized. Where a color conversion table is used, faster color conversion processing can be realized.

In the preceding embodiments, matrix M is determined using color space information described by the ColorSpace tag, but where associated with image data GD control information, matrix M may be determined using color space information to be used during image processing, stored in control information. In this case, for example, matrix values for matrix M may be stored as color space information, and matrix M set by reading out the stored matrix values.

While in the preceding embodiments of image processing, color printer 20 is used as the output apparatus, a display apparatus such as a CRT, LCD, projector etc. could also be used as the output apparatus. In this case, depending on the display apparatus used as the output apparatus, an image processing program (display driver) for executing the image processing described in FIG. 7 etc., for example, could be used. Or where a CRT etc. functions as a display apparatus for a computer, the image processing program can be run on the computer side. In this case the final output image data will have the RGB color space, not the CMYK color space.

In this case, in a manner analogous to print results via color printer 20 being able to reflect the color space of color values generated by a digital still camera 12, it is possible to designate, by means of the image file, display results in a display apparatus such as a CRT. Accordingly, by including parameters suited to a display apparatus such as a CRT in the control information of an image file, image data GD created by a digital still camera 12 can be correctly displayed.

Although the color space converting apparatus pertaining to the present invention has been described on the basis of some examples, the aforementioned aspects of the present invention are merely to facilitate understanding of the present invention, and do not limit the present invention. The present invention can be modified and improved without departing from the spirit and scope thereof as recited in the claims, and these equivalents are of course included in the present invention.

The parameter values given in the preceding embodiments are merely exemplary and the invention pertaining to this application is not limited by these parameters. Further, the values of matrices S, M, L and L' in the equations are merely exemplary, and may be modified as appropriate with reference to target color space, the color space that can be utilized by color printer 20, and the like.

In the preceding embodiments, color space information read out from the image file is used to improve color space accuracy and perform matching of white point, but image data could be analyzed directly to acquire color space information, or color space information could be entered separately.

In the preceding embodiments the use of a digital still camera 12 as the image file generating apparatus is described, but scanners, digital video cameras or the like may be used as well. Where a scanner is used, specification of image file output control information may performed on a computer PC, or performed with the scanner independently by providing the scanner with preset buttons having assigned thereto preset information for setting information, or with a display screen and setting buttons for making arbitrary settings.

The color spaces used in the preceding embodiments are merely exemplary, and other color spaces may be used. In any case, it is sufficient for image data created by an image data generating apparatus such as a digital still camera 12 etc. to be output reflecting the color space of the image data generating apparatus.

The preceding embodiments describe an Exif format file as the image file, but the image file format pertaining to the present invention is not limited thereto. Any image file that includes at least image data for output by an output apparatus and information relating to color space used in an image data generating apparatus such as a digital still camera 12 etc. is sufficient. This is because with such a file, difference in output image between image data generated in an image data generating apparatus (image display obtained through a monitor etc.) and output image in an output apparatus can be minimized.

The color printer 20 pertaining to the preceding examples is merely exemplary, and the arrangement thereof is not limited to that described in the examples. It is sufficient for color printer 20 to be able to analyze extra information and control information in an image file, and output (print) an image in response to described or designated color space information.

In the preceding embodiments, there is described byway of example the case of image data GD and control information being included in the same image file GF, but it is not necessary for image data GD and control information to be stored in the same file. That is, image data GD and control information may be associated, for example, generating associated data consisting of associated image data GD and control information, storing one or a plurality of image data and control information in independent files, and referring to the associated control information when processing the image data GD. While in this case image data and control information are stored in separate files, during image processing using the control information, the image data and control information are indivisibly united, so functionality is substantially the same as with storage in a single file. That is, the aspect of using associated image data and control information, at least during image processing, is included in the image file GF in the present examples. Motion video files stored on optical media such as CD-ROM, CD-R, DVD-ROM, DVD-RAM and other optical disk media are also included.

What is claimed is:

1. A color space converting apparatus for converting a color value of a first color space to a color value of a second color space, said color space converting apparatus comprising:

a first color space converting module for converting the color value of the first color space to the color value of the second color space so as to eliminate deviation of a converted color value derived by converting the color value of a white point of the first color space to the second color space, and the color value of a white point of the second color space, wherein the first color space converting module includes a plurality of color conversion tables, prepared for each combination of the first color space and second color space, having characteristics for matching a converted color value, derived by converting to the second color space the color value of the white point of the first color space, with the color value of the white point of the second color space;

a selecting module for selecting, on the basis of a combination of the first color space and the second color space, one color conversion table from among the plurality of color conversion tables; and a second color space converting module for converting a color value of the first color space to a color value of the second color space using the selected color conversion table.

2. A color space converting apparatus for converting a color value of a first color space to a color value of a second color space, said color space converting apparatus comprising:

a first color space converting module for converting the color value of the first color space to the color value of the second color space so as to eliminate deviation of a converted color value derived by converting a color value of a white point of the first color space to the second color space, and a color value of a white point of the second color space, wherein the first color space converting module includes a plurality of color conversion matrices, prepared for each combination of the first color space and second color space, having characteristics for matching a converted color value, derived by converting to the second color space the color value of the white point of the first color space, with the color value of the white point of the second color space;

a selecting module for selecting, on the basis of a combination of the first color space and the second color space, one color conversion matrix from among the plurality of color conversion matrices; and a second color space converting module for executing a matrix operation to convert a color value of the first color space to a color value of the second color space using the selected color conversion matrix.

3. A color space converting apparatus according to claims 1 or 2 wherein the first color space and second color space are device-dependent color spaces dependent on a device, and a first color value of a device-independent color space, derived by converting the color value of the white point of the first color space, is equal to a second color value of the device-independent color space, derived by converting the color value of the white point of the second color space.

4. A color space converting apparatus for matching a color value of a white point of a first color space with a color value of a white point of a second color space in a device-independent color space that is independent of any device, and converting a color value of the first color space to a color value of the second color space, said color space converting apparatus comprising:

a plurality of color conversion tables, prepared for each combination of the first color space and second color space, having characteristics for matching the color value of the white point of the second color space with a converted color value, derived by converting the color value of the white point of the first color space to the second color space using a third matrix generated on the basis of a first matrix for converting a color value of the first color space to a color value of the device-independent color space, and a second matrix for converting a color value of the second color space to a color value of the device-independent color space;

a selecting module or selecting, on the basis of a combination of the first color space and the second color space, one color conversion table from among the plurality of color conversion tables; and a color space converting module for converting a color value of the first color space to a color value of the second color space using the selected color conversion table.

5. A color space converting apparatus for matching a color value of a white point of a first color space with a color value of a white point of a second color space in a device-independent color space that is independent of any device, and converting a color value of the first color space to a color value of the second color space, said color space converting apparatus comprising:

a color space converting module for converting a color value of the first color space to a color value of the second color space using a third matrix created on the basis of a first matrix for converting a color value of the first color space to a color value of the device-independent color space and a second matrix for converting a color value of the second color space to a color value of the device-independent color space;

a deviation calculating module for calculating deviation of the color value of an achromatic color of the second color space with respect to a converted color value converted from the color value of an achromatic color of the first color space to a color value of the second color space by means of the converting module; and a conversion accuracy improving module for reflecting the calculated deviation to improve color space conversion accuracy by the color space converting module.

6. A color space converting apparatus according to claim 5 wherein the conversion accuracy improving module reflects the deviation and corrects the color value converted to a color value of the second color space.

7. A color space converting apparatus according to claim 5 wherein the conversion accuracy improving module reflects the deviation and corrects the third matrix to improve the conversion accuracy.

8. A color space converting apparatus for matching a color value of a white point of a first color space with a color value of a white point of a second color space in a device-independent color space that is independent of any device, and converting a color value of the first color space to a color value of the second color space, said color space converting apparatus comprising:

a plurality of color conversion matrices, prepared for each combination of the first color space and second color space, having characteristics for matching a converted color value, derived by converting to the second color space the color value of the white point of the first color space, with the color value of the white point of the second color space;

a selecting module for selecting, on the basis of a combination of the first color space and the second color space, one color conversion matrix from among the plurality of color conversion matrices; and a color space converting module for executing a matrix operation, using the selected color conversion matrix, to convert a color value of the first color space to a color value of the second color space.

9. A color space converting apparatus according to any of claims 4 to 8 further comprising:

a file reader for reading the color value and output control information from a file that includes within a single file the color value and the output control information, which stipulates output conditions for color values;

wherein the first color space is determined on the basis of the read output control information.

10. A color space converting apparatus for converting a color value of a first color space to a color value of a second color space, said color space converting apparatus comprising:

a first converting module for converting a color value of the first color space to a color value of a device-independent color space using a first matrix;

a second converting module for converting a color value of the second color space to a color value of the device-independent color space using a second matrix;

a determining module for determining whether a color value of a first white point in the device-independent color space, converted from the color value of the white point of the first color space by the first converting module, matches the a color value of a second white point in the device-independent color space, converted from the color value of the white point of the second color space by the second converting module;

a third converting module for converting a color value of the first color space to a color value of the second color space using a third matrix created on the basis of the first matrix and the second matrix;

a deviation calculating module that, in the event it is determined that the color value of the first white point and the color value of the second white point match, calculates deviation of a color value of an achromatic color of the second color space and a converted color value that has been converted by the third converting module from a color value of an achromatic color of the first color space to a color value of the second color space; and a conversion accuracy improving module for improving color space conversion accuracy by the third converting module on the basis of the calculated deviation.

11. A color space converting apparatus according to claim 10 further comprising:

a first correcting module that, in the event it is determined that the color value of the first white point and the color value of the second white point do not match, corrects the second matrix so that the color value of the second white point matches the color value of the first white point.

12. A color space converting apparatus according to claim 10 further comprising:

a second correcting module that, in the event it is determined that the color value of the first white point and the color value of the second white point do not match, corrects the first matrix so that the color value of the first white point matches the color value of the second white point.

13. A color space converting apparatus for matching a white point in a first RGB color space with a white point in a second RGB color space in an XYZ color space, and converting a color value (R1, G1, B1) in the first RGB color space to a color value (R2, G2, B2) in the second RGB color space, wherein said color space converting apparatus comprises:

a converting module for converting a color value (R1, G1, B1) of the first RGB color space to a color value (R1, G1, B1) of the second RGB color space by means of the following Equation 1, using a matrix $L=N^{1}M$ calculated in advance on the basis of a matrix M used for converting a color value in a first RGB color space to a color value of an XYZ color space, and a matrix N used for converting a color value in a second RGB color space to a color value of an XYZ color space;

$$\begin{pmatrix} R2 \\ G2 \\ B2 \end{pmatrix} = L \begin{pmatrix} R1 \\ G1 \\ B1 \end{pmatrix} = \begin{pmatrix} a3 & b3 & c3 \\ d3 & e3 & f3 \\ g3 & h3 & i3 \end{pmatrix} \begin{pmatrix} R1 \\ G1 \\ B1 \end{pmatrix} \quad \text{Equation 1}$$

a deviation calculating module for calculating deviation of a color value (1, 1, 1) representing the white point of the second color space with respect to a converted white point color value (a3+b3+c3, d3+e3+f3, g3+h3+i3), converted by the converting module from a color value (1, 1, 1) representing the white point of the first color space, to a color value representing the white point of the second color space; and a conversion accuracy improving module for reflecting the calculated deviation to improve color space conversion accuracy by the converting module.

14. A color space converting apparatus for converting a color value (R1, G1, B1) in a first RGB color space to a color value (R2, G2, B2) in a second RGB color space, wherein said color space converting apparatus comprises:

a first converting module for converting a color value (R1, G1, B1) of the first RGB color space to a color value (X, Y, Z) of an XYZ color space by means of the following Equation 1, using a matrix M;

$$\begin{pmatrix} X \\ Y \\ Z \end{pmatrix} = M \begin{pmatrix} R1 \\ G1 \\ B1 \end{pmatrix} = \begin{pmatrix} a1 & b1 & c1 \\ d1 & e1 & f1 \\ g1 & h1 & i1 \end{pmatrix} \begin{pmatrix} R1 \\ G1 \\ B1 \end{pmatrix} \quad \text{Equation 1}$$

a second converting module for converting a color value (R2, G2, B2) of the second RGB color space to a color value (X, Y, Z) of an XYZ color space by means of the following Equation 2, using a matrix N;

$$\begin{pmatrix} X \\ Y \\ Z \end{pmatrix} = N \begin{pmatrix} R2 \\ G2 \\ B2 \end{pmatrix} = \begin{pmatrix} a2 & b2 & c2 \\ d2 & e2 & f2 \\ g2 & h2 & i2 \end{pmatrix} \begin{pmatrix} R2 \\ G2 \\ B2 \end{pmatrix} \quad \text{Equation 2}$$

a third converting module for converting a color value (R1, G1, B1 of the first RGB color space to a color value (R2, G2, B2) of the second RGB color space by means of the following Equation 3, using a matrix $L=N^{-1}M$ calculated in advance on the basis of a matrix M and matrix N;

$$\begin{pmatrix} R2 \\ G2 \\ B2 \end{pmatrix} = L \begin{pmatrix} R1 \\ G1 \\ B1 \end{pmatrix} = \begin{pmatrix} a3 & b3 & c3 \\ d3 & e3 & f3 \\ g3 & h3 & i3 \end{pmatrix} \begin{pmatrix} R1 \\ G1 \\ B1 \end{pmatrix} \quad \text{Equation 3}$$

a determining module for determining whether the three relationships a1+b1+c1=a2+b2+c2, d1+e1+f1=d2+e2+f2, and g1+h1+i1=g2+h2+i2 are true for a color value of the XYZ color space derived by converting a color value (1, 1, 1) representing a white point of the first RGB color space by means of the first converting module, and a color value of the XYZ color space derived by converting a color value (1, 1, 1) representing a white point of the second RGB color space by means of the second converting module;

a deviation calculating module that, in the event it is determined that the three relationships are true, calculates deviation of a color value (1, 1, 1) representing the white point of the second RGB color space with respect to a converted color value (a3+b3+c3, d3+e3+f3, g3+h3+i3), converted by the third converting module from a color value (1, 1, 1) representing the white point of the first RGB color space to a color value of the second RGB color space; and a first correcting module for correcting the coefficients of the matrix L so as to eliminate the calculated deviation.

15. A color space converting apparatus according to claim 14 further comprising:

a second correcting module that, in the event that it is determined that at least one relationship of the three relationships is not true, corrects the matrix N.

16. A color space converting apparatus according to claim 14 further comprising:

a third correcting module that, in the event that it is determined that at least one relationship of the three relationships is not true, corrects the matrix M.

17. A method of color space conversion for converting a color value of a first color space to a color value of a second color space, said method of color space conversion comprising:

determining whether a color value of a first white point converted from a color value of a white point of the first color space to a color value of a device-independent color space using a first matrix, matches the color value of a second white point converted from a color value of a white point of the second color space to a color value of the device-independent color space using a second matrix;

when it is determined that the color value of the first white point and the color value of the second white point match, calculating deviation of the color value of the second white point with respect to a converted value converted to the second color space from the color value of an achromatic color of the first color space using a third matrix created on the basis of the first matrix and the second matrix; and correcting the matrix coefficients of the third matrix so as to eliminate the calculated deviation.

18. A method of color space conversion for converting a color value (R1, G1, B1) in a first RGB color space to a color value (R2, G2, B2) in a second RGB color space, said method of color space conversion comprising:

determining whether the three relationships a1+b1+c1=a2+b2+c2, d1+e1+f1=d2+e2+f2, and g1+h1+i1=g2+h2+i2 are true for a color value of an XYZ color space derived by converting a color value (1, 1, 1) representing a white point of the first color space using the following Equation 1 including a matrix M, and a color value of the XYZ color space derived by converting a color value (1, 1, 1) representing a white point of the second RGB color space using the following Equation 2 including a matrix N;

$$\begin{pmatrix} X \\ Y \\ Z \end{pmatrix} = M \begin{pmatrix} R1 \\ G1 \\ B1 \end{pmatrix} = \begin{pmatrix} a1 & b1 & c1 \\ d1 & e1 & f1 \\ g1 & h1 & i1 \end{pmatrix} \begin{pmatrix} R1 \\ G1 \\ B1 \end{pmatrix} \quad \text{Equation 1}$$

$$\begin{pmatrix} X \\ Y \\ Z \end{pmatrix} = N \begin{pmatrix} R2 \\ G2 \\ B2 \end{pmatrix} = \begin{pmatrix} a2 & b2 & c2 \\ d2 & e2 & f2 \\ g2 & h2 & i2 \end{pmatrix} \begin{pmatrix} R2 \\ G2 \\ B2 \end{pmatrix} \quad \text{Equation 2}$$

in the event it is determined that the three relationships are true, calculating deviation of a color value (1, 1, 1) representing the white point of the second color space with respect to a converted color value (a3+b3+c3, d3+e3+f3, g3+h3+i3), converted from a color value (1, 1, 1) representing the white point of the first color value of the second color space using the following Equation 3 including a matrix N precalculated on the basis of matrix M and matrix N; and $$\begin{pmatrix} R2 \\ G2 \\ B2 \end{pmatrix} = L \begin{pmatrix} R1 \\ G1 \\ B1 \end{pmatrix} = \begin{pmatrix} a3 & b3 & c3 \\ d3 & e3 & f3 \\ g3 & h3 & i3 \end{pmatrix} \begin{pmatrix} R1 \\ G1 \\ B1 \end{pmatrix} \quad \text{Equation 3}$$

correcting the coefficients of the matrix L so as to eliminate the calculated deviation.

19. A color space converting program for converting a color value of a first color space to a color value of a second color space, wherein said color space converting program is embodied on a computer-readable medium and includes program instructions for causing a computer to implement:

a function for determining whether a color value of a first white point converted to a device-independent color space from a color value of a white point of the first color space using a first matrix matches a color value of a second white point converted to a device-independent color space from a color value of a white point of the second color space using a second matrix;

a function that, in the event that it is determined that the color value of the first white point and the color value of the second white point match, calculates deviation of a color value of an achromatic color of the second color space with respect to a converted value converted to the second color space from the color value of an achromatic color of the first color space using a third matrix created on the basis of the first matrix and the second matrix; and a function for reflecting the calculated deviation to improve the accuracy of the color conversion.

20. A color space converting program for converting a color value (R1, G1, B1) in a first RGB color space to a color value (R2, G2, B2) in a second RGB color space, wherein said color space converting program is embodied on a computer-readable medium and includes program instructions for causing a computer to implement:

a function for determining whether the three relationships a1+b1+c1=a2+b2+c2, d1+e1+f1=d2+e2+f2, and g1+h1+i1=g2+h2+i2 are true for a color value of a XYZ color space derived by converting a color value (1, 1, 1) representing a white point of the first color space using the following Equation 1 including a matrix M, and a color value of the XYZ color space derived by converting a color value (1, 1, 1) representing a white point of the second color space using the following Equation 2 including a matrix N;

$$\begin{pmatrix} X \\ Y \\ Z \end{pmatrix} = M \begin{pmatrix} R1 \\ G1 \\ B1 \end{pmatrix} = \begin{pmatrix} a1 & b1 & c1 \\ d1 & e1 & f1 \\ g1 & h1 & i1 \end{pmatrix} \begin{pmatrix} R1 \\ G1 \\ B1 \end{pmatrix} \quad \text{Equation 1}$$

$$\begin{pmatrix} X \\ Y \\ Z \end{pmatrix} = N \begin{pmatrix} R2 \\ G2 \\ B2 \end{pmatrix} = \begin{pmatrix} a2 & b2 & c2 \\ d2 & e2 & f2 \\ g2 & h2 & i2 \end{pmatrix} \begin{pmatrix} R2 \\ G2 \\ B2 \end{pmatrix} \quad \text{Equation 2}$$

a function that, in the event it is determined that the three relationships are true, calculates deviation of a color value (1, 1, 1) representing the white point of the second color space with respect to a converted color value (a3+b3+c3, d3+e3+f3, g3+h3+i3), converted from a color value (1, 1, 1) representing the white point of the first color space to a color value of the second color space using the following Equation 3 including a matrix N precalculated on the basis of matrix M and matrix N; and $$\begin{pmatrix} R2 \\ G2 \\ B2 \end{pmatrix} = L \begin{pmatrix} R1 \\ G1 \\ B1 \end{pmatrix} = \begin{pmatrix} a3 & b3 & c3 \\ d3 & e3 & f3 \\ g3 & h3 & i3 \end{pmatrix} \begin{pmatrix} R1 \\ G1 \\ B1 \end{pmatrix} \quad \text{Equation 3}$$

a function for reflecting the calculated deviation to improve the accuracy of the color conversion.

21. A method of color space conversion for converting a color value of a first color space to a color value of a second color space, said method of color space conversion comprising:

converting a color value of the first color space to a color value of the second color space so as to eliminate deviation of the color value of a white point of the second color space from a converted color value converted to the second color space from the color value of a white point of the first color space, wherein the converting a color value of the first color space to a color value of the second color space includes selecting, on the basis of a combination of the first color space and the second color space, one color conversion table from among a plurality of color conversion tables, wherein the plurality of color conversion tables, prepared for each combination of the first color space and second color space, has characteristics for matching a converted color value, derived by converting to the second color space the color value of the white point of the first color space, with the color value of the white point of the second color space; and converting a color value of the first color space to a color value of the second color space using the selected color conversion table.

22. A method of color space conversion for converting a color value of a first color space to a color value of a second color space, said method of color space conversion comprising:

converting a color value of the first color space to a color value of the second color space so as to eliminate deviation of the color value of a white point of the second color space from a converted color value converted to the second color space from the color value of a white point of the first color space, wherein the converting a color value of the first color space to a color value of the second color space includes selecting, on the basis of a combination of the first color space and the second color space, one color conversion matrix from among a plurality of color conversion matrices, wherein the plurality of color conversion matrices, prepared for each combination of the first color space and second color space, has characteristics for matching a converted color value, derived by converting to the second color space the color value of the white point of the first color space, with the color value of the white point of the second color space; and executing a matrix operation to convert a color value of the first color space to a color value of the second color space using the selected color conversion matrix.

23. A color space converting program for converting a color value of a first color space to a color value of a second color space, wherein said color space converting program is embodied on a computer-readable medium and includes program instructions for causing a computer to implement:

a first color conversion function for converting a color value of the first color space to a color value of the second color space, in such a way as to eliminate deviation of a converted color value, derived by converting a color value of a white point of the first color space to the second color space, with respect to the color value of a white point of the second color space, wherein the first color conversion function includes a selecting function for selecting, on the basis of a combination of the first color space and the second color space, one color conversion table from among a plurality of color conversion tables, wherein the plurality of color conversion tables, prepared for each combination of the first color space and second color space, has characteristics for matching a converted color value, derived by converting to the second color space the color value of the white point of the first color space, with the color value of the white point of the second color space; and a second color conversion function for converting a color value of the first color space to a color value of the second color space using the selected color conversion table.

24. A color space converting program for converting a color value of a first color space to a color value of a second color space, wherein said color space converting program is embodied on a computer-readable medium and includes program instructions for causing a computer to implement:

a first color conversion function for converting a color value of the first color space to a color value of the second color space, in such a way as to eliminate deviation of a converted color value, derived by converting a color value of a white point of the first color space to the second color space, with respect to the color value of a white point of the second color space, wherein the first color conversion function includes a selecting function for selecting, on the basis of a combination of the first color space and the second color space, one color conversion matrix from among a plurality of color conversion matrices, wherein the plurality of color conversion matrices, prepared for each combination of the first color space and second color space, has characteristics for matching a converted color value, derived by converting to the second color space the color value of the white point of the first color space, with the color value of the white point of the second color space; and a second color conversion function for executing a matrix operation to convert a color value of the first color space to a color value of the second color space using the selected color conversion matrix.

* * * * *